US009446473B2

United States Patent
Hasegawa et al.

(10) Patent No.: US 9,446,473 B2
(45) Date of Patent: Sep. 20, 2016

(54) ELECTRIC RESISTANCE WELDING OPERATION MANAGEMENT DEVICE, ELECTRIC RESISTANCE WELDING OPERATION MANAGEMENT METHOD, AND COMPUTER PROGRAM

(71) Applicant: NIPPON STEEL & SUMITOMO METAL CORPORATION, Tokyo (JP)

(72) Inventors: Noboru Hasegawa, Tokyo (JP); Toshisuke Fukami, Tokyo (JP); Nobuo Mizuhashi, Tokyo (JP); Hideki Hamatani, Tokyo (JP); Yoshifumi Karube, Tokyo (JP); Takao Miura, Tokyo (JP); Kimiharu Tanaka, Tokyo (JP); Kazuto Yamamoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/394,707

(22) PCT Filed: Apr. 5, 2013

(86) PCT No.: PCT/JP2013/060540
§ 371 (c)(1),
(2) Date: Oct. 15, 2014

(87) PCT Pub. No.: WO2013/157422
PCT Pub. Date: Oct. 24, 2013

(65) Prior Publication Data
US 2015/0090697 A1    Apr. 2, 2015

(30) Foreign Application Priority Data

Apr. 18, 2012   (JP) ................. 2012-095073
Jul. 4, 2012    (JP) ................. 2012-150610

(51) Int. Cl.
  *B23K 11/25*   (2006.01)
  *B23K 11/08*   (2006.01)
(Continued)

(52) U.S. Cl.
  CPC ............. *B23K 11/253* (2013.01); *B21B 37/74* (2013.01); *B21B 37/78* (2013.01); *B21C 37/08* (2013.01); *B23K 11/0873* (2013.01); *B23K 13/025* (2013.01); *B23K 13/08* (2013.01)

(58) Field of Classification Search
  CPC   B23K 13/08; B23K 11/253; B23K 11/0873; B21C 37/08; B21B 37/74; B21B 37/78
  USPC ....................................... 348/84, 90; 382/152
  See application file for complete search history.

(56) References Cited

U.S. PATENT DOCUMENTS 4,168,430 A * 9/1979 Denis ................... B23K 11/252
                                                       219/110
4,649,256 A * 3/1987 Minamida .............. B23K 13/02
                                                       219/121.62
(Continued)

FOREIGN PATENT DOCUMENTS

CA    2066105 C       7/1997
JP    52-123950 A  * 10/1977
(Continued)

OTHER PUBLICATIONS

Machine translation of Japan Patent document No. 2009-233,678, Sep. 2015.*
(Continued)

*Primary Examiner* — Geoffrey S Evans
(74) *Attorney, Agent, or Firm* — Birch, Stewart, Kolasch & Birch, LLP

(57) ABSTRACT

An electric resistance welding operation management device manages a welding operation during manufacture of electric resistance welded steel pipe, in which heat is input to a steel plate, that is being conveyed along a specific conveyance direction and formed into a circular tube shape while pressing side faces of the metal plate with a pair of squeeze rolls, to weld together two circumferential direction edge portions of the metal plate converging in a V-shape. The electric resistance welding operation management device includes an image input section that inputs plural images and each including a Vee convergence region of the steel plate. The electric resistance welding operation management device includes a welding point position derivation section that derives the position of a welding point.

25 Claims, 22 Drawing Sheets

(51) Int. Cl.
*B23K 11/087* (2006.01)
*B21B 37/74* (2006.01)
*B21B 37/78* (2006.01)
*B21C 37/08* (2006.01)
*B23K 13/08* (2006.01)
*B23K 13/02* (2006.01)

(56) References Cited

U.S. PATENT DOCUMENTS

| | | | | |
|---|---|---|---|---|
| 5,140,123 | A * | 8/1992 | Mitani | B21C 37/08 219/60 R |
| 9,199,291 | B2 * | 12/2015 | Hasegawa | B21C 37/08 |
| 2010/0232678 | A1 * | 9/2010 | Hasegawa | B21C 37/08 382/141 |
| 2010/0258535 | A1 * | 10/2010 | Fukutani | B23K 13/025 219/108 |
| 2012/0325805 | A1 | 12/2012 | Hasegawa et al. | |
| 2015/0076117 | A1 * | 3/2015 | Neugebauer | B23K 13/025 219/61.5 |

FOREIGN PATENT DOCUMENTS

| | | |
|---|---|---|
| JP | 4-231181 A | 8/1992 |
| JP | 5-261564 A | 10/1993 |
| JP | 2009-233678 A * | 10/2009 |
| JP | 2009-255132 A | 11/2009 |
| WO | WO 2011/118560 A1 | 9/2011 |

OTHER PUBLICATIONS

International Search Report issued in PCT/JP2013/060540 dated Jun. 25, 2013.
JP Office Action issued in JP 2013-533050, dated Nov. 12, 2013.
Written Opinion of the International Searching Authority issued in PCT/JP2013/060540 dated Jun. 25, 2013.
Canadian Office Action and Search Report for corresponding Canadian Application No. 2,870,427, dated Dec. 1, 2014.

* cited by examiner

FIG.4
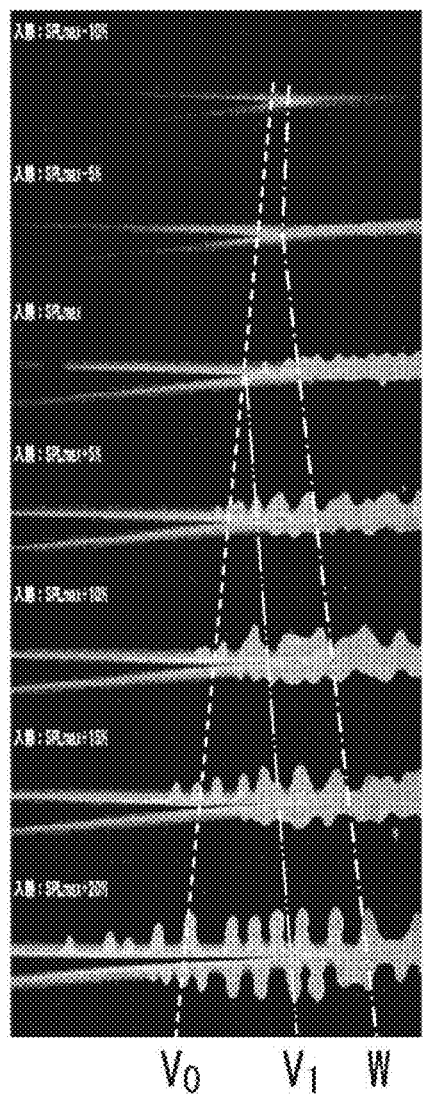
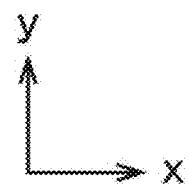

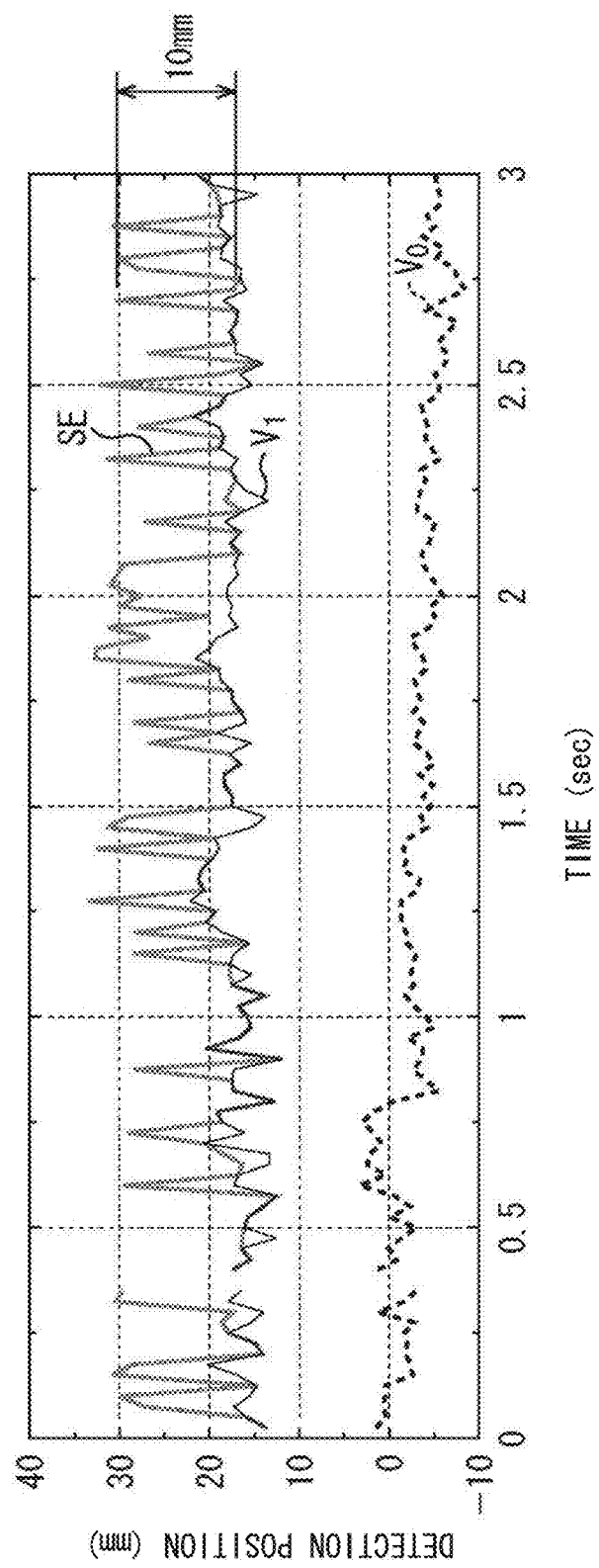

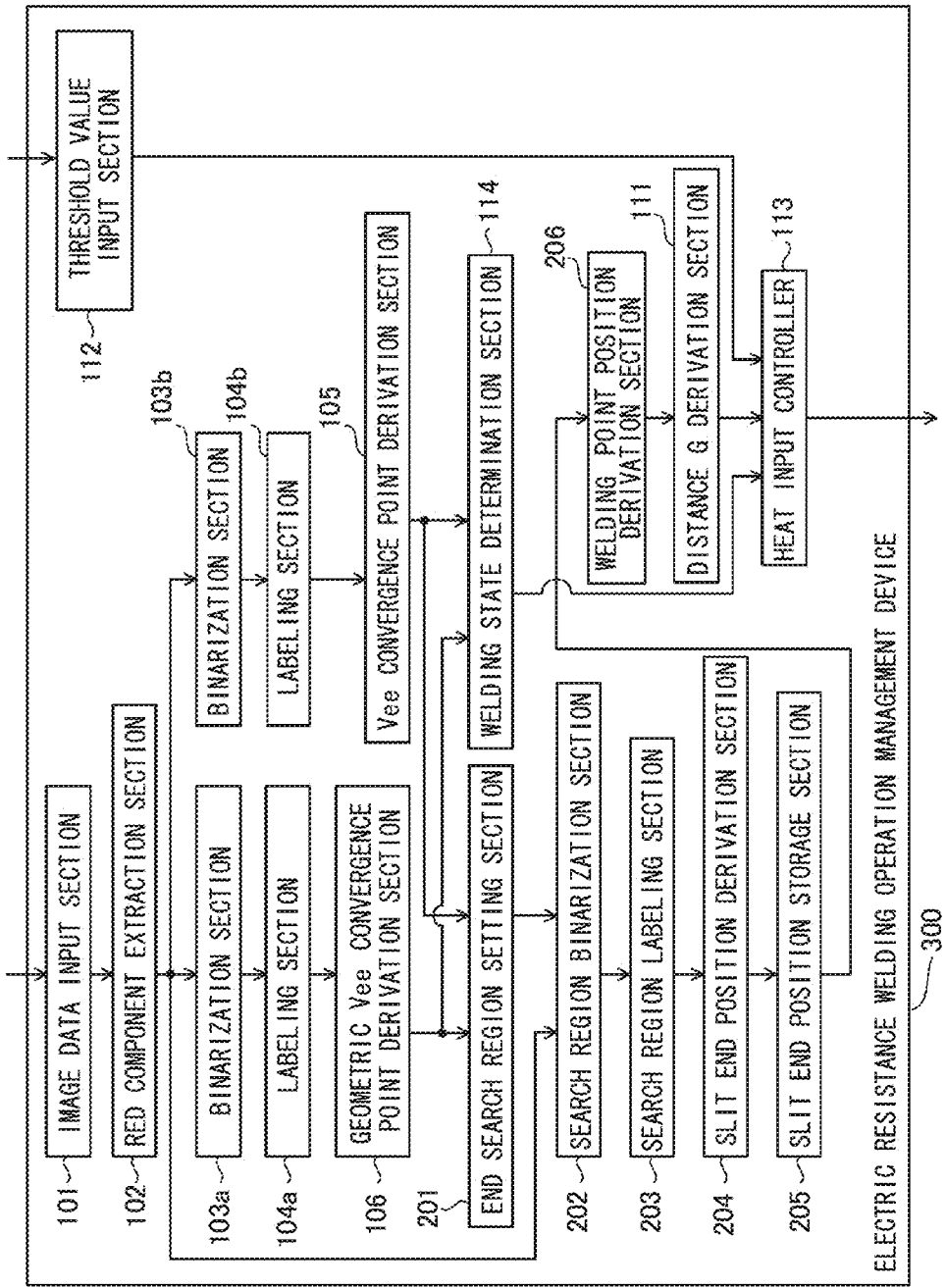

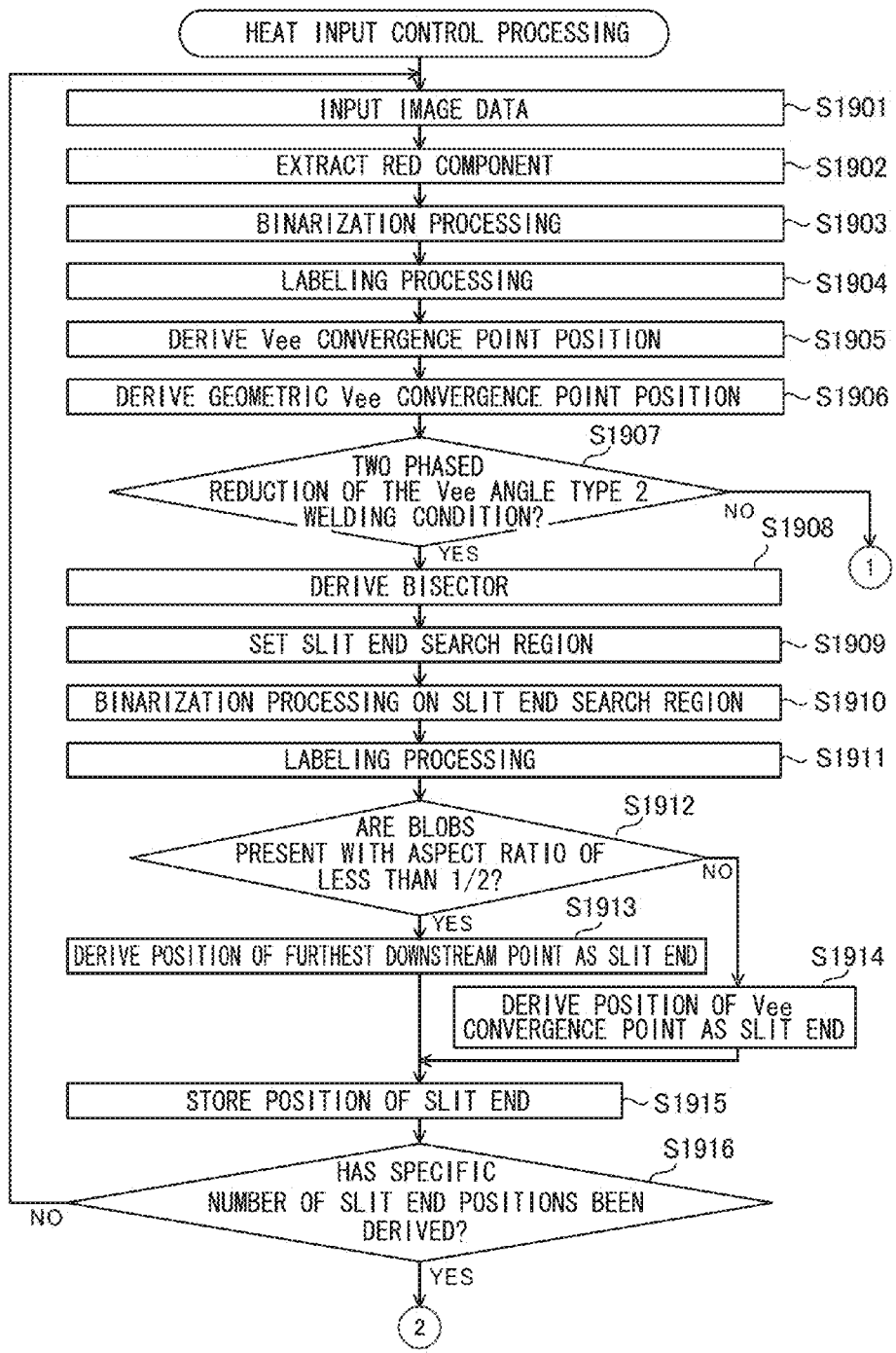

ELECTRIC RESISTANCE WELDING OPERATION MANAGEMENT DEVICE, ELECTRIC RESISTANCE WELDING OPERATION MANAGEMENT METHOD, AND COMPUTER PROGRAM

TECHNICAL FIELD

The present invention relates to an electric resistance welding operation management device, an electric resistance welding operation management method, and a computer program, and is particularly well-suited for use in high frequency resistance welding and induction heat welding (hereafter referred to as electric resistance welding), in which a metal plate is continuously formed into a circular tube shape by a set of rollers while being conveyed, and in which two circumferential direction edge portions of the metal plate are converged in a V-shape and heated, melted, and abutted.

BACKGROUND ART

Electric resistance welded steel pipe is utilized in a wide range of fields, including gasoline and natural gas line pipes, oil well pipes, and nuclear, geothermal, chemical plant, mechanical structural, and general pipes. When manufacturing electric resistance welded steel pipe, a strip shaped steel plate such as a hot-rolled steel strip is formed into a pipe shape, and heated and melted by a high frequency current while converging abutting edge faces in a V-shape, to form a weld seam. Weld defects occur in electric resistance welding when heat input power, welding speed and the like are not controlled within appropriate ranges. For example, non-welded portions sometimes occur in cases in which the heat input is insufficient, or the welding speed is fast. Moreover, a large quantity of oxide sometimes remains on the welded portion in cases in which the heat input is excessive, or the welding speed is slow.

Welding conditions during electric resistance welding are generally broadly divided into three types of welding condition: a type 1 welding condition with small positional fluctuation of a welding point where the end faces of a metal plate first contact; a type 2 welding condition with intermediate positional fluctuation amplitude and positional fluctuation cycle of the welding point; and a type 3 welding condition with large positional fluctuation amplitude and positional fluctuation cycle of the welding point. In fast welding speed cases, if the heat input is increased, a type 2 welding condition accompanied by two-phased reduction of the Vee angle exists, that differs from the type 1 welding condition, the type 2 welding condition, and the type 3 welding condition.

The two-phased reduction of the Vee angle type 2 welding condition is a welding condition with an intermediate positional fluctuation amplitude and positional fluctuation cycle of the welding point, similarly to the type 2 welding condition, and the weld portion forms a two-stage V shape.

FIG. 20 schematically illustrates relationships between welding speed and heat input for each type of welding condition. In FIG. 20, region 2001 corresponds to the type 1 welding condition, region 2002 corresponds to the type 2 welding condition, region 2003 corresponds to the type 3 welding condition, and region 2004 corresponds to the two-phased reduction of the Vee angle type 2 welding condition. $V_m$ is the critical welding speed at which the two-phased reduction of the Vee angle type 2 welding condition appears, and $T_m$ is the melting point of the steel plate.

When the welding speed is below the critical welding speed $V_m$ and the heat input is low, the welding condition becomes the type 1 welding condition. When the heat input is increased, even when the welding speed is below the critical welding speed $V_m$, the welding condition becomes the type 2 welding condition, and transitions to the type 3 welding condition when the heat input is increased further. However, when the welding speed is the critical welding speed $V_m$ or greater, the welding condition transitions from the type 1 welding condition to the type 2 welding condition accompanying an increase in the heat input, and when the heat input is increased further, becomes the two-phased reduction of the Vee angle type 2 welding condition.

In the type 1 welding condition, there is a possibility of being unable to melt the steel plate over the entire thickness direction of the circumferential direction edge portions of the steel plate that are abutted against each other. In the type 3 welding condition, there is a possibility of a large quantity of oxide remaining on the weld portion due to overheating of the circumferential direction edge portions of the steel plate that are abutted against each other. Moreover, although the type 2 welding condition enables the steel plate to be melted over the entire thickness direction of the circumferential direction edge portions of the steel plate that are abutted against each other, there is concern that a region might develop to a state at the boundary with the two-phased reduction of the Vee angle type 2 welding condition, in which oxide remains on the weld portion. There is also a possibility that the range of the type 2 welding condition narrows due to the effects of, for example, variation in forming. Such cases make it difficult to control heat input to stay within the range of the type 2 welding condition, it is desirable to perform electric resistance welding in a two-phased reduction of the Vee angle type 2 welding condition with wider range.

Technology for performing electric resistance welding in the two-phased reduction of the Vee angle type 2 welding condition is described in Japanese Patent Application Laid-Open (JP-A) No. H04-231181 and International Publication (WO) No. 2011/118560.

JP-A No. H04-231181 describes employing a vibration amplitude Δf of a signal obtained by F/V conversion of fine fluctuations in the output frequency of a power source supplied to perform electric resistance welding, together with a fluctuation count SPL per time unit of the signal, to create conditions to give a welding condition of the two-phased reduction of the Vee angle type 2 welding condition, and outputting a heat input power that satisfies the conditions, as a heat input control reference signal.

SUMMARY OF INVENTION

Technical Problem

However, in the technology disclosed in JP-A No. H04-231181, when the welding condition is the two-phased reduction of the Vee angle type 2 welding condition, an analogue voltage value of the fine fluctuations (namely, the differential waveform) of the power source output frequency is less than the value when the welding condition is the type 2 welding condition. The fine fluctuations of the above power source output frequency are sometimes 1/20 or less of the total amplitude, and the central frequency is ever-changing, making it difficult to extract and observe the fine fluctuation component alone. As a result, in the technology disclosed in JP-A No. H04-231181, it is not easy to control the heat input so as to reliably give a welding condition of the two-phased reduction of the Vee angle type 2 welding condition.

In consideration of the above circumstances, an object of the present invention is to enable control of heat input, to make the welding condition that of a two-phased reduction of the Vee angle type 2 welding condition, to be performed more easily and more reliably than hitherto.

Solution to Problem

A first aspect of the present invention provides an electric resistance welding operation management device that manages an electric resistance welding operation during manufacture of electric resistance welded steel pipe, in which heat is input to a metal plate, that is being conveyed along a specific conveyance direction and formed into a circular tube shape while pressing side faces of the metal plate with a pair of squeeze rolls, to weld together two circumferential direction edge portions of the metal plate converging in a V-shape, the electric resistance welding operation management device including: an image input means that inputs plural images that are successively captured over a specific duration and each include a Vee convergence region that is a region where the metal plate converges in a V-shape; a first position detection means that, based on the images input by the image input means, detects the position of a geometric Vee convergence point that is a geometric intersection point of the two circumferential direction edge portions of the metal plate converging in a V-shape; a second position detection means that, based on the images input by the image input means, detects the position of a Vee convergence point that is an contact point where the two circumferential direction edge portions of the metal plate converging in a V-shape abut each other; a first welding point position derivation means that, based on each of the plural images input by the image input means, derives a position at each point in time within the specific duration, of a slit end at the furthest conveyance direction downstream point of a weld slit, having the Vee convergence point, that is an contact point where the two circumferential direction edge portions of the metal plate converging in a V-shape abut each other, as a base point and extending further than the Vee convergence point toward the metal plate conveyance direction downstream side, and derives the position of a welding point, based on acquired data that takes as the position of a welding point the position, out of positions of the slit end at each point in time within the specific duration, at the point in time when the slit end is positioned furthest downstream in the conveyance direction; and a determination means that determines whether or not the position of the geometric Vee convergence point detected by the first position detection means and the position of the Vee convergence point detected by the second position detection means are present at different positions to each other.

A second aspect of the present invention provides the electric resistance welding operation management device of the first aspect, further including: a storage means that stores a distance $\Delta L$ between the position of a welding point expressed by the data and the position of the Vee convergence point detected by the second position detection means; wherein the welding point position derivation means derives the position of the metal plate welding point based on the position of the Vee convergence point detected by the second position detection means and the distance $\Delta L$ stored in the storage means.

A third aspect of the present invention provides the electric resistance welding operation management device of the second aspect, wherein the storage means stores the distance $\Delta L$ for each steel type.

A fourth aspect of the present invention provides the electric resistance welding operation management device of the first aspect, wherein the welding point position derivation means includes a slit end position derivation means that, based on each of the plural images input by the image input means, derives the position of a slit end of a weld slit for each image input by the image input means, and, out of the slit end positions derived by the slit end position derivation means, derives the slit end position positioned furthest downstream in the conveyance direction as the position of the welding point.

A fifth aspect of the present invention provides the electric resistance welding operation management device of any one of the first aspect to the fourth aspect, further including: a heat input control means that, if the position of the geometric Vee convergence point and the position of the Vee convergence point are determined by the determination means to be present at different positions to each other, lowers a heat input power to the metal plate in cases in which a distance between the position of the welding point derived by the welding point position derivation means and a position corresponding to an installation position of the pair of squeeze rolls has become a threshold value, or shorter.

A sixth aspect of the present invention provides the electric resistance welding operation management device of either the second aspect or the third aspect, further including: a distance $\Delta L$ derivation means that derives the distance $\Delta L$ based on the position of the Vee convergence point derived by the second position detection means, and the position of the welding point expressed by the data; and the storage means stores the distance $\Delta L$ derived by the distance $\Delta L$ derivation means before the position of the welding point is derived by the welding point position derivation means.

A seventh aspect of the present invention provides the electric resistance welding operation management device of the sixth aspect, wherein: the distance $\Delta L$ derivation means, based on each of plural images captured over a duration that is at least longer than a fluctuation cycle of the Vee convergence point position, derives as the distance $\Delta L$ a distance between an average position of the Vee convergence point derived by the second position detection means and the welding point position expressed by the data.

An eighth aspect of the present invention provides the electric resistance welding operation management device of the fourth aspect, further including: a search region setting means that sets a search region for the slit end, based on the position of the geometric Vee convergence point detected by the first position detection means, and an estimated weld line that is a weld line estimated as a bisector of a Vee convergence angle that is an angle formed between straight line approximations of regions corresponding to the circumferential direction edge portions of the Vee convergence region of the metal plate; and the slit end position derivation means derives the position of the slit end within the search region set by the search region setting means.

A ninth aspect of the present invention provides the electric resistance welding operation management device of either the fourth aspect or the eighth aspect, wherein each of the images input by the image input means is an image captured with an exposure time of $\frac{1}{5000}$ sec or under.

A tenth aspect of the present invention provides the electric resistance welding operation management device of any one of the fourth aspect, the eighth aspect, or the ninth aspect, wherein the image input means inputs plural images successively captured over a duration of 250 msec or greater.

An eleventh aspect of the present invention provides the electric resistance welding operation management device of any one of the fourth aspect, the eighth aspect, the ninth aspect, or the tenth aspect, wherein: out of plural slit end positions derived by the slit end position derivation means, the welding point position derivation means derives a moving average value of coordinate values expressing the position of the slit end positioned furthest downstream in the conveyance direction as the position of the welding point.

A twelfth aspect of the present invention provides the electric resistance welding operation management device of the fifth aspect, wherein: the heat input control means controls so as to lower the heat input power to the metal plate if a distance between the position of the welding point derived by the welding point position derivation means and a flat plane including the axial centers of the pair of squeeze rolls is a specific threshold value or shorter.

A thirteenth aspect of the present invention provides the electric resistance welding operation management device of any one of the first aspect to the twelfth aspect, further including: a display means that displays at least one out of the position of the welding point derived by the welding point position derivation means, or a distance between the position of a welding point derived by the welding point position derivation means and a position corresponding to an installation position of the pair of squeeze rolls.

A fourteenth aspect of the present invention provides an electric resistance welding operation management method that manages an electric resistance welding operation during manufacture of electric resistance welded steel pipe, in which heat is input to a metal plate, that is being conveyed along a specific conveyance direction and formed into a circular tube shape while pressing side faces of the metal plate with a pair of squeeze rolls, to weld together two circumferential direction edge portions of the metal plate converging in a V-shape, the electric resistance welding operation management method including: an image input step of inputting plural images that are successively captured over a specific duration and each include a Vee convergence region that is a region where the metal plate converges in a V-shape; a first position detection step of, based on the images input at the image input step, detecting the position of a geometric Vee convergence point that is a geometric intersection point of the two circumferential direction edge portions of the metal plate converging in a V-shape; a second position detection step of, based on the images input at the image input step, detecting the position of a Vee convergence point that is an contact point where the two circumferential direction edge portions of the metal plate converging in a V-shape abut each other; a welding point position derivation step of, based on each of the plural images input at the image input step, deriving the position of a welding point, based on acquired data that takes as the position of a welding point the position, out of positions at each point in time within the specific duration, of a slit end at the furthest conveyance direction downstream point of a weld slit, having the Vee convergence point as a base point and extending further than the Vee convergence point toward the metal plate conveyance direction downstream side, at the point in time when the slit end is positioned furthest downstream in the conveyance direction; and a determination step of determining whether or not the position of the geometric Vee convergence point detected at the first position detection step and the position of the Vee convergence point detected at the second position detection step are present at different positions to each other.

A fifteenth aspect of the present invention provides the electric resistance welding operation management method of the fourteenth aspect, further including: a storage step of storing a distance $\Delta L$ between the position of a welding point expressed by the data and the position of the Vee convergence point; wherein, at the welding point position derivation step, deriving the position of the metal plate welding point based on the position of the Vee convergence point detected at the second position detection step and the distance $\Delta L$ stored at the storage step.

A sixteenth aspect of the present invention provides the electric resistance welding operation management method of the fifteenth aspect, wherein at the storage step, the distance $\Delta L$ is stored for each steel type.

A seventeenth aspect of the present invention provides the electric resistance welding operation management method of the fourteenth aspect, wherein the welding point position derivation step includes a slit end position derivation step that, based on each of the plural images input at the image input step, derives the position of a slit end of a weld slit for each image input at the image input step, and, in the welding point position derivation step, out of the slit end positions derived at the slit end position derivation step, the slit end position positioned furthest downstream in the conveyance direction is derived as the position of the welding point.

An eighteenth aspect of the present invention provides the electric resistance welding operation management method of any one of the fourteenth aspect to the seventeenth aspect, further including: a heat input control step that, if the geometric Vee convergence point and the position of the Vee convergence point are determined at the determination step to be present at different positions to each other, lowers a heat input power to the metal plate in cases in which a distance between the position of the welding point derived at the welding point position derivation step and a position corresponding to an installation position of the pair of squeeze rolls has become a threshold value, or shorter.

A nineteenth aspect of the present invention provides the electric resistance welding operation management method of either the fifteenth aspect or the sixteenth aspect, further including: a distance $\Delta L$ derivation step of deriving the distance $\Delta L$ based on the position of the Vee convergence point, and the position of the welding point expressed by the data; and at the storage step, storing the distance $\Delta L$ derived at the distance $\Delta L$ derivation step before the position of the welding point is derived at the welding point position derivation step.

A twentieth aspect of the present invention provides the electric resistance welding operation management method of the nineteenth aspect, wherein: at the distance $\Delta L$ derivation step, based on each of plural images captured over a duration that is at least longer than a fluctuation cycle of the Vee convergence point position, deriving as the distance $\Delta L$ a distance between an average position of the derived Vee convergence point and the welding point position expressed by the data.

A twenty-first aspect of the present invention provides the electric resistance welding operation management method of the seventeenth aspect, further including: a search region setting step that sets a search region for the slit end, based on the position of the geometric Vee convergence point detected at the first position detection step, and an estimated weld line that is a weld line estimated as a bisector of a Vee convergence angle that is an angle formed between straight line approximations of regions corresponding to the circumferential direction edge portions of the Vee convergence region of the metal plate; and at the slit end position derivation step, deriving the position of the slit end within the search region set at the search region setting step.

A twenty-second aspect of the present invention provides the electric resistance welding operation management method of either the seventeenth aspect or the twenty-first aspect, wherein each of the images input at the image input step is an image captured with an exposure time of 1/5000 sec or under.

A twenty-third aspect of the present invention provides the electric resistance welding operation management method of any one of the seventeenth aspect, the twenty-first aspect, or the twenty-second aspect, wherein at the image input step plural images successively captured over a duration of 250 msec or greater are input.

A twenty-fourth aspect of the present invention provides the electric resistance welding operation management method of any one of the seventeenth aspect, the twenty-first aspect, the twenty-second aspect, or the twenty-third aspect, wherein: out of plural slit end positions derived at the slit end position derivation step, at the welding point position derivation step, a moving average value of coordinate values expressing the position of the slit end positioned furthest downstream in the conveyance direction is derived as the position of a welding point.

A twenty-fifth aspect of the present invention provides the electric resistance welding operation management method of the eighteenth aspect, wherein: at the heat input control step, heat input is controlled so as to lower the heat input power to the metal plate if a distance between the position of the welding point derived at the welding point position derivation step and a flat plane including the axial centers of the pair of squeeze rolls is a specific threshold value or shorter.

A twenty-sixth aspect of the present invention provides the electric resistance welding operation management method of any one of the fourteenth aspect to the twenty-fifth aspect, further including: a display step of displaying at least one out of the position of the welding point derived at the welding point position derivation step, or a distance between the position of a welding point derived at the welding point position derivation step and a position corresponding to an installation position of the pair of squeeze rolls.

A twenty-seventh aspect of the present invention provides a computer program to cause functioning as the respective means of the welding operation management device of any one of the first aspect to the thirteenth aspect.

Advantageous Effects of Invention

The present invention enables control of heat input, to make the welding condition that of a two-phased reduction of the Vee angle type 2 welding condition, to be performed more easily and more reliably than hitherto.

BRIEF DESCRIPTION OF DRAWINGS

FIG. 4 illustrates examples of Vee convergence region images captured by an image capture device.

FIG. 15 is a graph illustrating a first example of transition over time of a geometric Vee convergence point, a Vee convergence point, and a slit end.

FIG. 16 is a drawing illustrating an example of a functional configuration of an electric resistance welding operation management device according to a third exemplary embodiment of the present invention.

FIG. 19A is a flow chart to explain an example of heat input control processing.

DESCRIPTION OF EMBODIMENTS

Explanation follows regarding exemplary embodiments of the present invention, with reference to the drawings. Note that in each of the drawings, some elements are omitted or simplified for ease of explanation or illustration.

First Exemplary Embodiment

Figure 1:
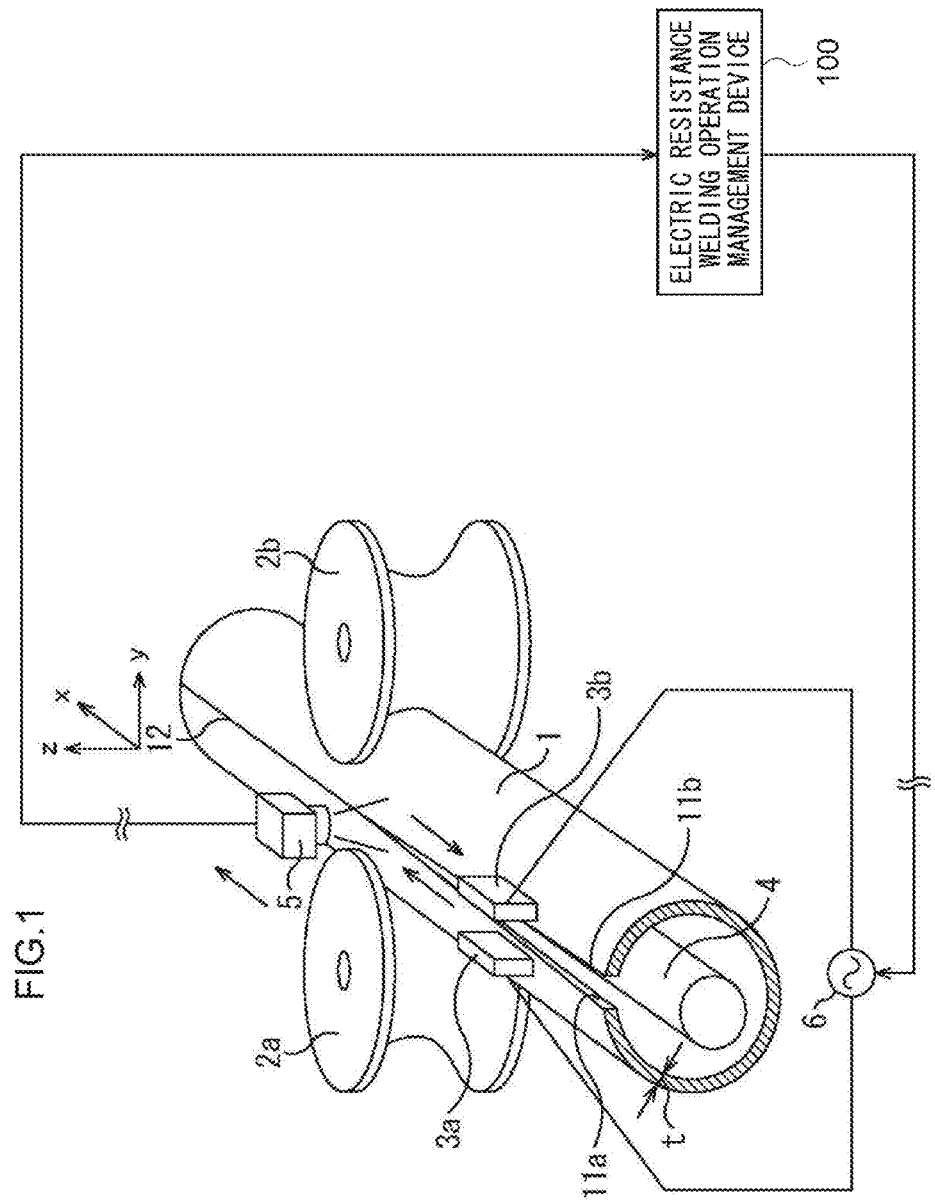
FIG. 1 is a drawing illustrating an example of a configuration of an electric resistance welded steel pipe manufacturing system according to an exemplary embodiment of the present invention.

Explanation is first given regarding a first exemplary embodiment of the present invention.
Electric Resistance Welded Steel Pipe Manufacturing System FIG. 1 is a drawing illustrating an example of configuration of an electric resistance welded steel pipe manufacturing system according to an exemplary embodiment of the present invention. Note that in the present exemplary embodiment, the positions of respective configuration elements in the electric resistance welded steel pipe manufacturing system, and positions in captured images, are each represented using the same 3-dimensional orthogonal coordinates (x, y, z coordinates). Namely, the 3-dimensional orthogonal coordinates x, y, z in each of the drawings indicate directions only, and originate from the same point in each of the drawings.

The electric resistance welded steel pipe manufacturing system illustrated in FIG. 1 includes squeeze rolls 2a, 2b, contact tips 3a, 3b, an impeder 4, an image capture device 5, a high frequency power source 6, and an electric resistance welding operation management device 100.

First, a brief explanation is given regarding electric resistance welded steel pipe manufacturing equipment. As illustrated in FIG. 1, a strip shaped steel plate 1 is continuously formed into a circular tube shape by a set of rollers (not illustrated in the drawings), while the steel plate 1 is conveyed in an x axis positive direction. The impeder 4, that converges magnetic flux onto a joining portion of the steel plate 1, is disposed inside the steel plate 1 that is formed into a circular tube shape. When high frequency power is supplied from the high frequency power source 6, high frequency current flows from the pair of contact tips 3a, 3b (or an inductance coil (not illustrated in the drawings)) at the surface of a region of the steel plate 1 converging in a V-shape. When this occurs, pressing force is applied to the steel plate 1 from both sides using the squeeze rolls 2a, 2b. Electric resistance welding (ERW) is accordingly performed by fusion welding the steel plate 1 by heating, melting, and abutting two circumferential direction edge portions 11a, 11b of the steel plate 1, while the two edge portions 11a, 11b are made to converge in a V-shape. Note that in the following explanation, the "region of the steel plate 1 converging in a V-shape" is referred to as the "Vee convergence region" as appropriate. A portion where the two circumferential direction edge portions 11a, 11b of the steel plate 1 abut each other so as to appear in a single line shape is referred to as the "weld line" as appropriate (see the weld line 12 in FIG. 1).

The image capture device 5 captures images of a spontaneous light emission pattern (radiation pattern) of a region including the surface of the Vee convergence region. The image capture device 5 employs, for example, a 3CCD type color camera with 1920×512 pixels. The image capture device 5 captures images of the region including the surface of the Vee convergence region under conditions of, for example, an image field of 50 mm×190 mm, a resolution of 100 µm/pixel, an imaging frame rate of 500 fps, and an exposure time of $1/10000$ sec. Note that to enable the electric resistance welding operation management device 100 to perform image processing, described later, and also to capture fluctuations in the position of a slit end SE at the furthest downstream point of a weld slit S, described later, the image capture device 5 is set up with an image capture range such that, in a captured image, the position of a Vee convergence point $V_1$ is, for example, at a position approximately $1/3$ from the conveyance direction (x axis direction) downstream side of the steel plate 1 during normal operation. The image capture device 5 performs successive image capture at regular time intervals. A single image that has been captured at the same timing is referred to as a frame. In the following explanation, "images" captured by the image capture device 5 are referred to as "Vee convergence region images", as appropriate.

Figure 2A:
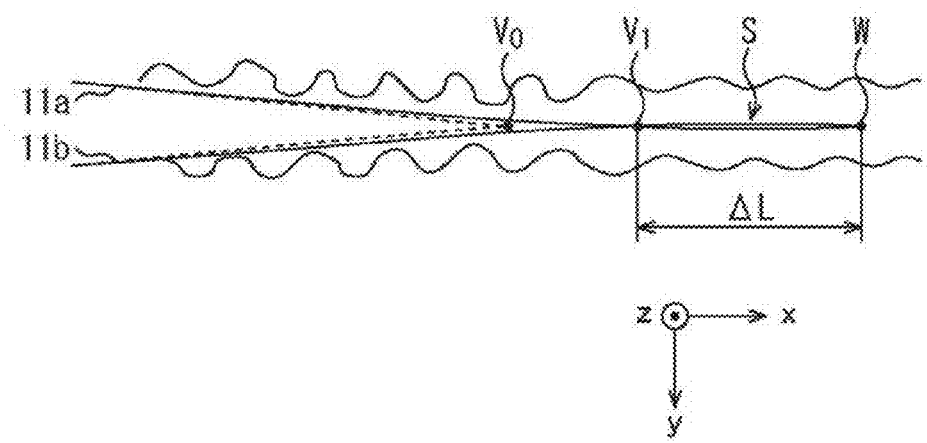
FIG. 2A is a schematic view of an example of a Vee convergence region in a two-phased reduction of the Vee angle type 2 welding condition.
Figure 2B:
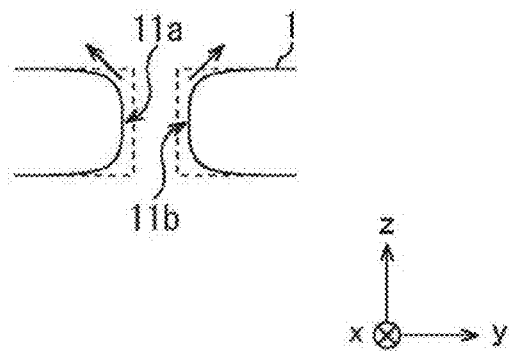
FIG. 2B is a schematic view of an example of a Vee convergence region in a two-phased reduction of the Vee angle type 2 welding condition.

The electric resistance welding operation management device 100 of the present exemplary embodiment is input with an image captured by the image capture device 5 of a region including the surface of the Vee convergence region, the slit end SE, and a welding point W (the Vee convergence region image). The electric resistance welding operation management device 100 then, for example, performs processing, on the Vee convergence region image, and controls the power amount (VA) output from the high frequency power source 6 so as to make the welding condition a two-phased reduction of the Vee angle type 2 welding condition. Detailed explanation regarding functioning of the electric resistance welding operation management device 100 is given later.
Explanation Regarding Two-Phased Reduction of the Vee Angle Type 2 Welding Phenomenon FIG. 2 schematically illustrates an example of a Vee convergence region in the two-phased reduction of the Vee angle type 2 welding condition. Specifically, in FIG. 2A the Vee convergence region is illustrated as viewed from above, and in FIG. 2B the Vee convergence region is illustrated as viewed from the steel plate 1 conveyance direction (x axis direction) upstream side, toward the direction of the Vee convergence point $V_1$.

In the two-phased reduction of the Vee angle type 2 welding condition, thickness direction central portions are melted and discharged (see the arrows in FIG. 2B) when thickness direction (z axis direction) molten portions are discharged whilst abutting together the circumferential direction edge portions 11a, 11b of the steel plate 1. Accordingly, as illustrated in FIG. 2A, the circumferential direction edge portions 11a, 11b of the steel plate 1 appear to retreat on the steel plate 1 conveyance direction (x axis direction) downstream side.

A two-phased reduction of the Vee angle type 2 welding condition is observed when high precision measurement of the Vee convergence point is performed by image capture at high definition without image lag (under conditions of image capture resolution: 100 µm/pixel, exposure time: $1/10000$ sec) of the spontaneous light emission pattern of the region including the Vee convergence region from above the steel plate 1. In the two-phased reduction of the Vee angle type 2 welding condition, as illustrated in FIG. 2A, both a geometric Vee convergence point $V_0$, a geometric Vee convergence point in a region relatively further toward the upstream side in the steel plate 1 conveyance direction (x axis direction), and the Vee convergence point $V_1$, an contact point relatively further toward the downstream side, are present. As illustrated by the intermittent lines in FIG. 2A, the geometric Vee convergence point $V_0$ is the point at which (downstream side extension lines (illustrated by intermittent lines) of) the circumferential direction edge portions 11a, 11b intersect geometrically in the steel plate 1 that is converging in a V-shape. However, the Vee convergence point $V_1$, the contact point, is the point where the circumferential direction edge portions 11a, 11b physically abut (contact) each other in the steel plate 1 converging in a V-shape.

During application of heat input of the heat input to achieve a welding condition of the type 2 welding condition, or greater, the welding point W, where solidification begins, is present at a region further toward the downstream side than the Vee convergence point $V_1$ that is the contact point, thereby forming the weld slit S that penetrates the steel plate 1 in the steel plate 1 thickness direction between the Vee convergence point $V_1$ and the welding point W. After the weld slit S has extended from the Vee convergence point $V_1$ toward the steel plate 1 conveyance direction (x axis direction) downstream side, it then disappears. Fluctuations in the x axis direction size of the weld slit S (growth and disappearance of the weld slit S) occur periodically, with a cycle of several msec. The Vee convergence point $V_1$ and the welding point W are both present along the weld line 12. In the following explanation, where the weld slit S is present, a hypothetical line passing through the width center of the weld slit S is regarded as the weld line at the weld slit portion.

Figure 3A:
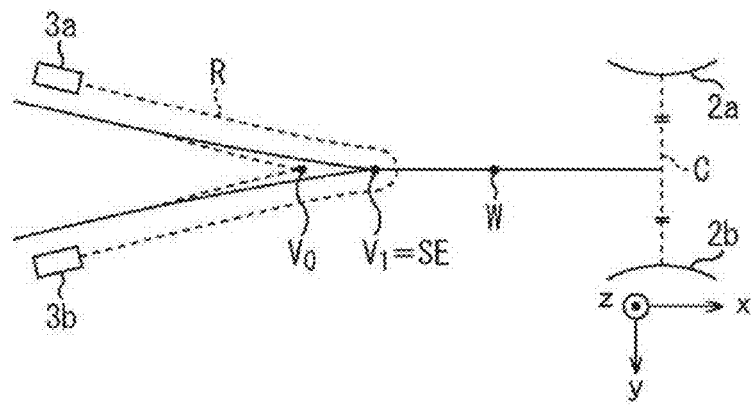
FIG. 3A is a schematic view illustrating an example of weld slit fluctuation.
Figure 3B:
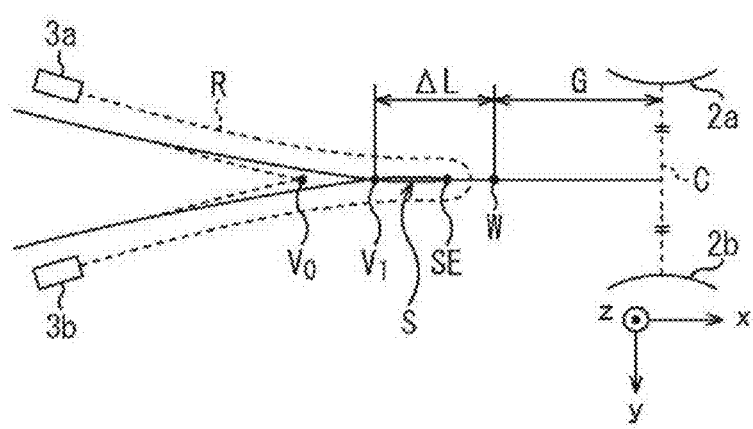
FIG. 3B is a schematic view illustrating an example of weld slit fluctuation.
Figure 3C:
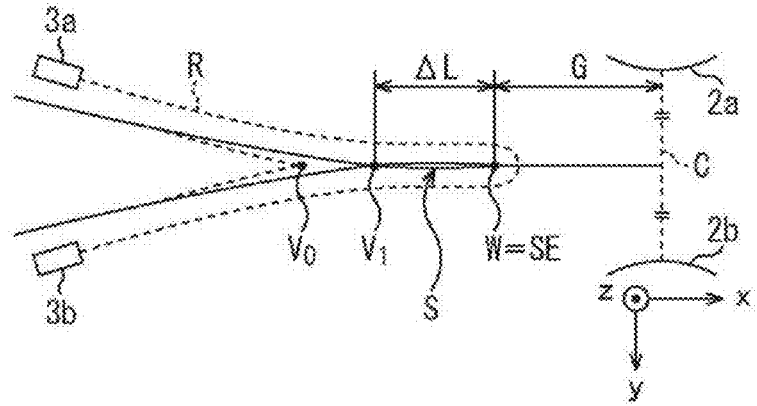
FIG. 3C is a schematic view illustrating an example of weld slit fluctuation.

FIG. 3 schematically illustrate an example of x axis direction fluctuation in the length of the weld slit S. Specifically, FIG. 3A illustrates a state in which the weld slit S has disappeared, FIG. 3B illustrates a state partway through growth of the weld slit S, and FIG. 3C illustrates a state when the weld slit S has finished growing, each as viewed from above.

New Findings Obtained by the Inventors

The inventors found that in a welding condition of the two-phased reduction of the Vee angle type 2 welding condition, a distance ΔL between the welding point W and the Vee convergence point $V_1$ is constant for each steel type, regardless of plate thickness, steel pipe outer diameter, and heat input power.

When a uniform amount of power is supplied from the high frequency power source 6, then, as illustrated in FIG. 3A, the route R of the high frequency current between the contact tips 3a, 3b is at its shortest in a state in which the weld slit S is not present. The resistance value to the high frequency current is accordingly at its lowest, and so the magnitude of the high frequency current is at its greatest. The temperature of the Vee convergence region accordingly rises, promoting discharge of molten steel at the welding portion (see FIG. 2B). Consequently, as illustrated in FIG. 3B, the weld slit S extends toward the steel plate 1 conveyance direction (x axis direction) downstream side.

The high frequency current route R between the contact tips 3a, 3b increases in length as the weld slit S extends toward the steel plate 1 conveyance direction (x axis direction) downstream side. The resistance value to the high frequency current accordingly increases, and so the magnitude of the high frequency current decreases. When this occurs, the temperature of the Vee convergence region drops, suppressing discharge of molten steel at the welding portion. Accordingly, as illustrated in FIG. 3C, once the weld slit S has grown to a certain extent, the portion that configured the weld slit S is closed off by the molten steel, and the weld slit S disappears, as illustrated in FIG. 3A. Note that the Vee convergence point $V_1$ also fluctuates periodically in the steel plate 1 conveyance direction (x axis direction), albeit with a longer cycle (of several hundred msec) than the fluctuation cycle of the x axis direction length of the weld slit S. The length of the weld slit S therefore fluctuates over time, with a fluctuation range between the Vee convergence point $V_1$ and the welding point W. Since the welding point W is the point where pressing force is applied to the steel plate 1 and solidification begins, namely, the point at which the abutting faces of the steel plate 1 are physically stable and contact each other, the weld slit S does not extend further to the downstream side than this position. Since it is molten steel that closes off the weld slit S, as described above, in a state in which electromagnetic force induced by the high frequency current acts normally, the molten steel that closes off the weld slit S is discharged normally, and the entire physical gap upstream of the welding point W is observed as the weld slit S.

The inventors moreover confirmed that in a welding condition of the two-phased reduction of the Vee angle type 2 welding condition, the distance ΔL between the welding point W and the Vee convergence point $V_1$ is substantially constant for each steel type, regardless of the steel pipe outer diameter, the steel plate 1 thickness (plate thickness) t, and the heat input power (for example, an instructed value of power output from the high frequency power source 6) to the steel plate 1.

In the present exemplary embodiment, the distance ΔL between the welding point W and the Vee convergence point $V_1$ is derived as follows. Average positions of the Vee convergence point $V_1$ are derived from plural Vee convergence region images successively captured over a duration longer than both the x axis direction length fluctuation cycle of the weld slit S and the fluctuation cycle of the position of the Vee convergence point $V_1$. The distance between the average position of the Vee convergence point $V_1$ and the welding point W is taken as ΔL. As described above, the fluctuation cycle of the Vee convergence point $V_1$ position is longer than the fluctuation cycle of the weld slit S x axis direction length. The distance ΔL between the average position of the Vee convergence point $V_1$ and the welding point W is accordingly obtainable by capturing plural Vee convergence region images over a longer duration than the Vee convergence point $V_1$ position fluctuation cycle.

FIG. 4 illustrates an example of Vee convergence region images captured by the image capture device 5. In FIG. 4, Vee convergence region images of steel plates 1 of the same steel type, steel pipe outer diameter, and thickness (plate thickness), each applied with different heat input powers, are illustrated arranged in sequence with the lowest heat input power at the top (the top image is the image with the lowest heat input, and the bottom image is the image with the highest heat input). In FIG. 4, the fourth to the seventh images from the top correspond to images showing a two-phased reduction of the Vee angle type 2 welding condition.

In each of the images in FIG. 4, the Vee convergence region of the steel plate 1 was captured over 3 sec, under conditions of resolution of 100 μm/pixel, an imaging frame rate of 500 fps, and an exposure time of 1/10000 sec.

Note that the vicinity of the Vee convergence region was captured over 3 sec, since, taking into consideration all causes of variation in electric resistance welding (such as variation in forming), performing image capture over of the vicinity of the Vee convergence region over 3 sec enables more reliable image capture of one fluctuation cycle worth of images.

As illustrated in FIG. 4, when the heat input power is lower than a heat input power that gives a two-phased reduction of the Vee angle type 2 welding condition, the "distance ΔL between the welding point W and the Vee convergence point $V_1$ (the x axis direction distance between the $V_1$, indicated by the double-dotted dashed line, and W, indicated by the single-dotted dashed line in FIG. 4)" obtained from the plural Vee convergence region images varies according to the heat input power (see the 1st to 3rd images from the top in FIG. 4). However, it can be seen that when the welding condition is the two-phased reduction of the Vee angle type 2 welding condition, the "distance ΔL between the welding point W and the Vee convergence point $V_1$" remains substantially the same regardless of the heat input power (see the 4th to 7th images from the top in FIG. 4).

Accordingly, when the welding condition is the two-phased reduction of the Vee angle type 2 welding condition, the distance ΔL between the welding point W and the Vee convergence point $V_1$ may be said to remain substantially the same regardless of the heat input power.

Figure 5:
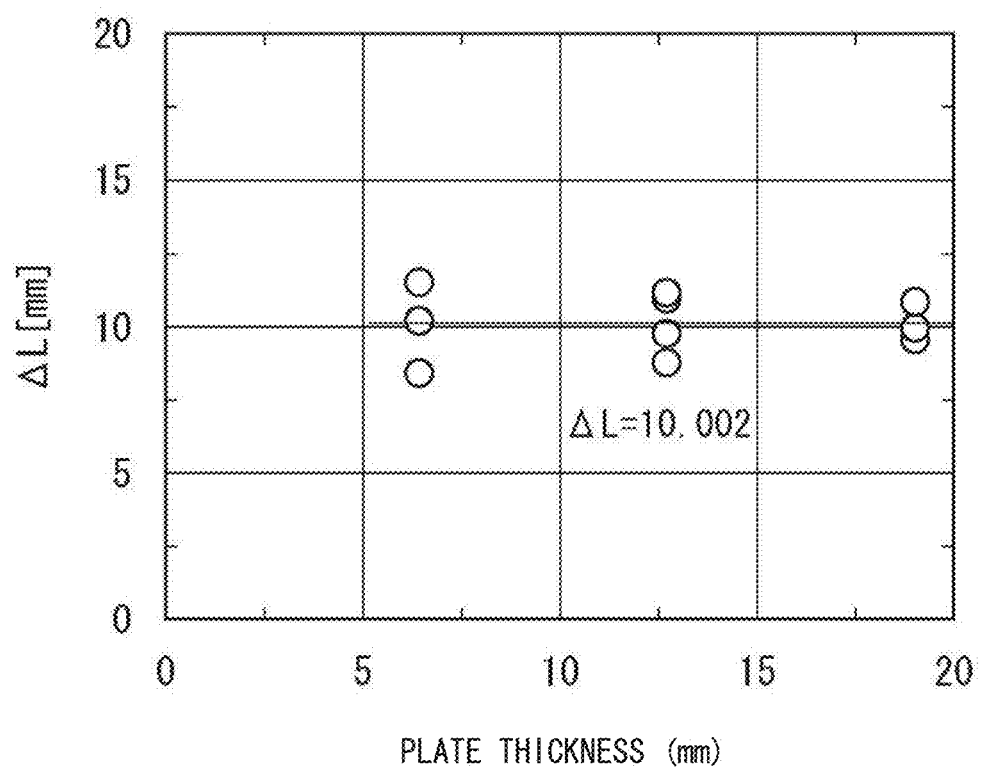
FIG. 5 is a graph illustrating an example of a relationship between a distance between a welding point and a Vee convergence point, and thickness (plate thickness) of a steel plate.

FIG. 5 illustrates an example of a relationship between the distance ΔL between the welding point W and the Vee convergence point $V_1$ and the thickness (plate thickness) of the steel plate 1 (when the welding condition is the two-phased reduction of the Vee angle type 2 welding condition).

The "distance ΔL between the welding point W and the Vee convergence point $V_1$" illustrated in FIG. 5 was obtained from Vee convergence region images of steel plates 1 of the same type of steel material and of different thicknesses (plate thickness).

As illustrated in FIG. 5, the distance ΔL between the welding point W and the Vee convergence point $V_1$ is substantially the same, at approximately 10 mm, regardless of the thickness (plate thickness) of the steel plate 1.

Accordingly, when the welding condition is the two-phased reduction of the Vee angle type 2 welding condition, the distance ΔL between the welding point W and the Vee convergence point $V_1$ may be said to remain substantially the same regardless of the thickness (plate thickness) of the steel plate 1.

As described above, the inventors found that when the welding condition is the two-phased reduction of the Vee angle type 2 welding condition, the distance ΔL between the welding point W and the Vee convergence point $V_1$ remains substantially the same regardless of the heat input power imparted to the steel plate 1, the outer diameter of the steel pipe, and the thickness (plate thickness) of the steel plate 1.

Suggested reasons for this are, for example, that there is almost no difference in the material properties (relationship between temperature and resistance values) of the steel plate 1 material (tensile strength=30 kgf/mm$^2$ to 50 kgf/mm$^2$) investigated, and that the angle of the V-shape forming the apex of the Vee convergence point $V_1$ and the thickness (plate thickness) of the steel plate 1 do not affect melting behavior on the steel plate 1 conveyance direction downstream side (x axis positive direction side) of the Vee convergence point $V_1$.

Note that in the following explanation, "the distance ΔL between the welding point W and the Vee convergence point $V_1$" is referred to as the "distance ΔL between the Vee convergence point and welding point", or simply as the "distance ΔL", as appropriate.

The inventors moreover found that when the welding condition is the two-phased reduction of the Vee angle type 2 welding condition, there is a deterioration in weld quality when an x axis direction distance G, between the welding point W and a yz flat plane including central roll shafts of the squeeze rolls 2a, 2b, is below a threshold value. Note that in the following explanation, an "x axis direction position C observed from above in the yz flat plane including central roll shafts of the squeeze rolls 2a, 2b" is referred to as the "squeeze center position C", as appropriate. Moreover, the "x axis direction distance G between the welding point W and the yz flat plane including the central roll shafts of the squeeze rolls 2a, 2b" is referred to as the "distance G between the welding point and squeeze center position", or the "distance G", as appropriate. Note that a height direction (z axis direction) position of the squeeze center position C may, for example, be a position corresponding to the apex portion of the circular tube shape, however the position is not limited thereto.

Figure 6:
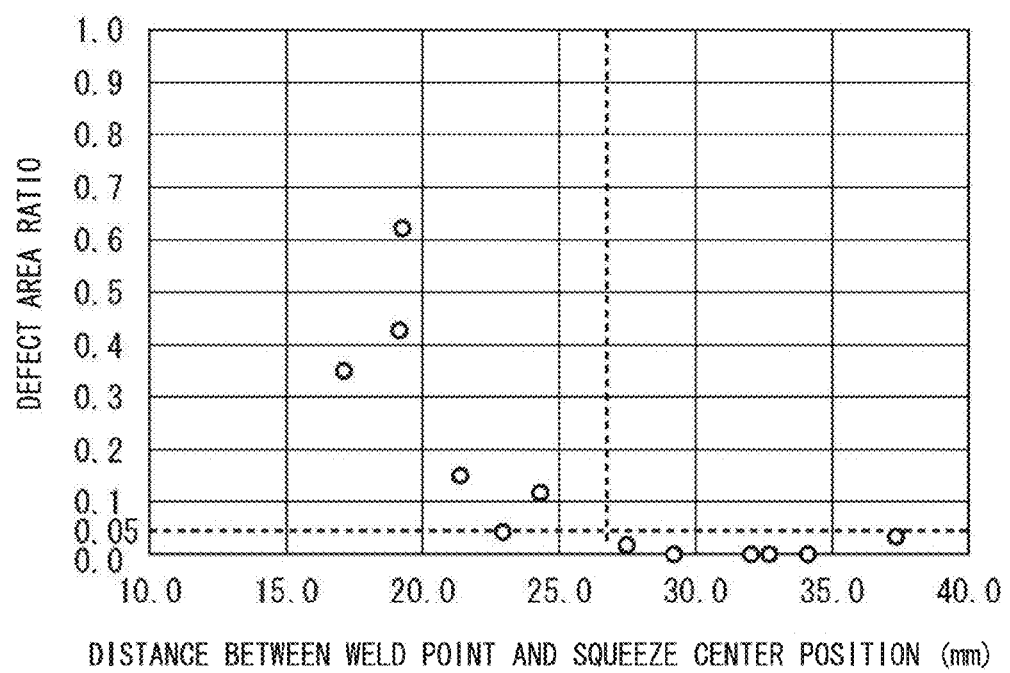
FIG. 6 is a graph illustrating an example of a relationship between a defect area ratio and a distance G between a welding point and a squeeze center position.

FIG. 6 illustrates an example of a relationship between defect area ratio and the distance G in the steel plate 1.

Electric resistance welding was performed on plural steel plates 1 of different thicknesses and steel pipe outer diameters, varying the distance G between the welding point W and the squeeze center position C. Welding portions were then cut out of the respective electric resistance welded steel pipes, and the proportion of the surface area of the cut-out faces with defects present, with respect to the surface area of the cut-out faces, was derived as the defect area ratio. The thus derived defect area ratios are plotted in FIG. 6.

As described above, the distance G is derived from the position of the welding point W and the squeeze center position C.

It can be seen from the example illustrated in FIG. 6 that the defect area ratio increases dramatically when the distance G is approximately 27 mm or less (see the vertical direction intermittent line in FIG. 6).

As described above, the inventors found that the distance ΔL between the Vee convergence point $V_1$ and the welding point W remains substantially the same, regardless of the heat input power imparted to the steel plate 1 and the thickness (plate thickness) of the steel plate 1, and also found that there is an increase in defects included in the welding portion when the distance G between the welding point W and the squeeze center position C becomes a threshold value or shorter.

In the electric resistance welding operation management device 100 according to the present exemplary embodiment, the distance ΔL is first measured offline and stored. Then, the electric resistance welding operation management device 100 controls the heat input power imparted to the steel plate 1 subject to electric resistance welding in the following manner when the welding condition is the two-phased reduction of the Vee angle type 2 welding condition.

First, the electric resistance welding operation management device 100 derives the position of the Vee convergence point $V_1$ from the images captured by the image capture device 5, and, as the welding point W, derives a point the pre-stored distance ΔL on the conveyance direction downstream side of the steel plate 1 from the position of the derived Vee convergence point $V_1$.

Next, the electric resistance welding operation management device 100 derives the distance G from the derived welding point W and the preset squeeze center position C.

Then, the electric resistance welding operation management device 100 controls to decrease the heat input power (the power amount output from the high frequency power source 6) to the steel plate 1 in cases in which the derived distance G is the threshold value or shorter.

Electric Resistance Welding Operation Management Device 100 Function

Detailed explanation follows regarding functions included in the electric resistance welding operation management device 100.

Figure 7:
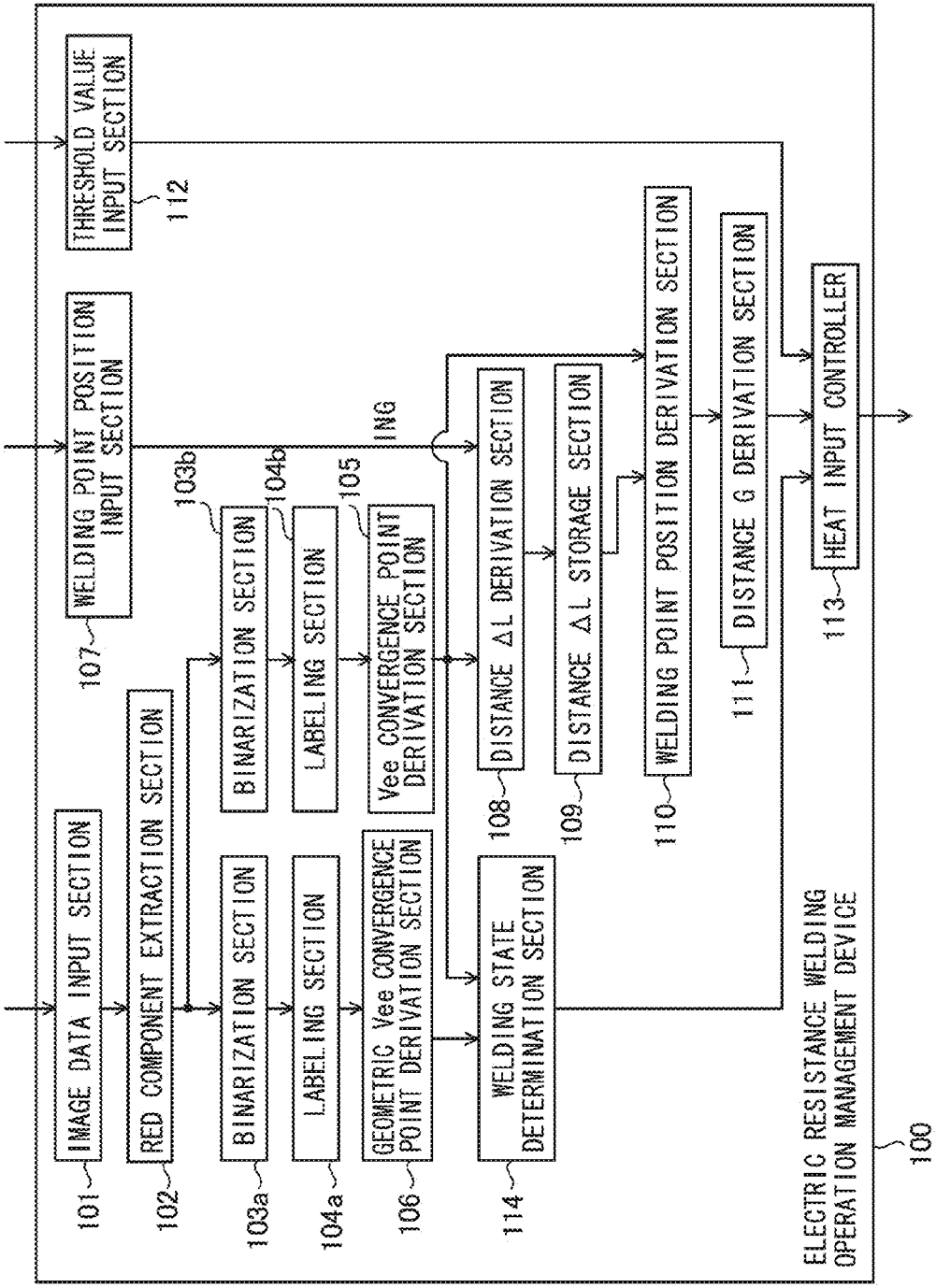
FIG. 7 is a drawing illustrating an example of a functional configuration of an electric resistance welding operation management device according to a first exemplary embodiment of the present invention.

FIG. 7 illustrates an example of a functional configuration of the electric resistance welding operation management device 100. The electric resistance welding operation management device 100 may be implemented by employing, for example, a data processing device including a CPU, ROM, RAM, a HDD and various interfaces.

Image Data Input Section 101

An image data input section 101 is input with image data of the Vee convergence region captured by the image capture device 5.

Figure 8:
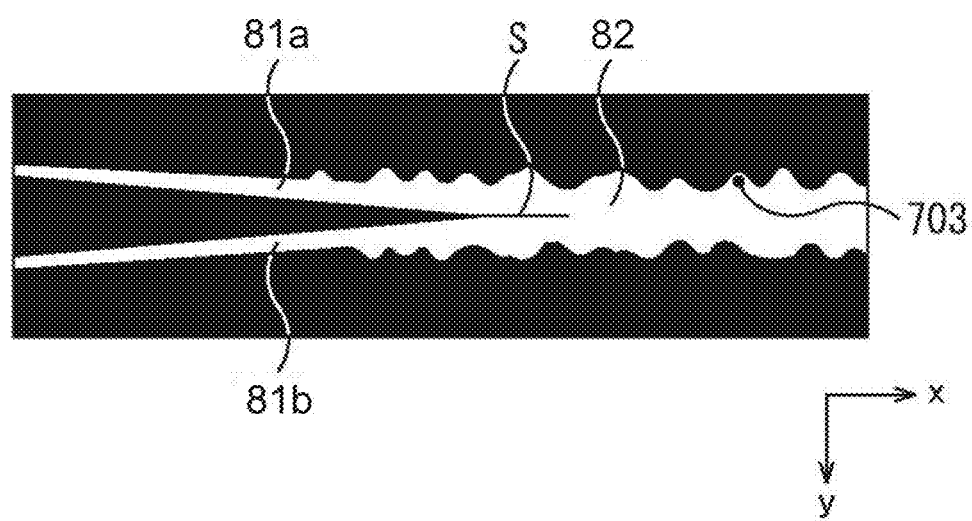
FIG. 8 is a pictorial representation illustrating an example of an image captured by an image capture device.

FIG. 8 is a pictorial representation of an example of a Vee convergence region image captured by the image capture device 5.

As illustrated in FIG. 8, in the Vee convergence region image captured by the image capture device 5, high heat regions 81a, 81b, with a high brightness level, appear along the circumferential direction edge portions 11a, 11b of the steel plate 1. Moreover, a wave-shaped pattern formed by discharge of molten portions of the circumferential direction edge portions 11a, 11b of the steel plate 1 appears in a region 82 to the conveyance direction (x axis direction) downstream side of the steel plate 1. The welding slit S appears along conveyance direction (x axis direction) of the steel plate 1, from the vicinity of the Vee convergence region.

The image data input section 101, is, for example, implemented by the CPU acquiring image data from the image capture device 5 through a communication interface, and temporarily storing the acquired image data in the RAM.

Red Component Extraction Section 102

A red component extraction section 102 extracts a red component (wavelength of 590 nm to 680 nm) from the image data in order to give clear contrast of the Vee convergence region image data input from the image data input section 101.

The red component extraction section 102 is, for example, implemented by the CPU reading the image data from, for example, the RAM and extracting the red component, and temporarily storing the extracted red component image data, in the RAM, or the like.

Binarization Sections 103a, 103b

Figure 9A:
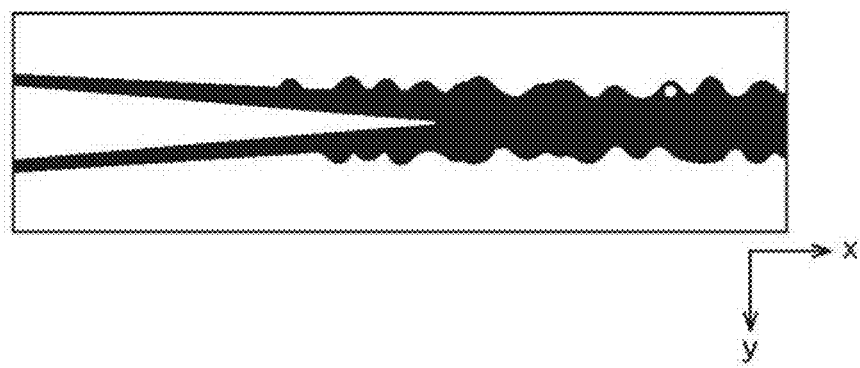
FIG. 9A is a drawing illustrating an example of an image that has been subject to binarization processing.

Binarization sections 103a, 103b binarize (invert) the red component image data obtained by the red component extraction section 102. Note that the binarization sections 103a, 103b assign a pixel value of 0 to pixels with a brightness level of a threshold value or above, and assign a pixel value of 1 to pixels with a brightness level below the threshold value. The binarization sections 103a, 103b have different brightness value threshold values. FIG. 9A is a pictorial representation of an example of a binarized image.

The binarization sections 103a and 103b are, for example, implemented by the CPU reading the red component image data, from the RAM or the like, performing binarization processing thereon, and temporarily storing the binarized image data, in the RAM, or the like.

Labeling Sections 104a, 104b

Labeling sections 104a, 104b perform labeling processing to assign a label to each blob on the binarized image obtained by the binarization sections 103a, 103b. A blob refers to individual connected regions obtained by, for each pixel, connecting together any pixels out of the eight adjacent pixels for a given pixel, including the four adjacent pixels in the up, down, left and right directions and the four adjacent pixels in the diagonal directions, that have been assigned a pixel value of 1. The labeling processing is processing to assign label numbers to the individual blobs, extract particular blobs, and to extract the position within the image (maximum and minimum x coordinates, and maximum and minimum y coordinates), the width, the length, the surface area, and the like of the extracted blobs.

Figure 9B:
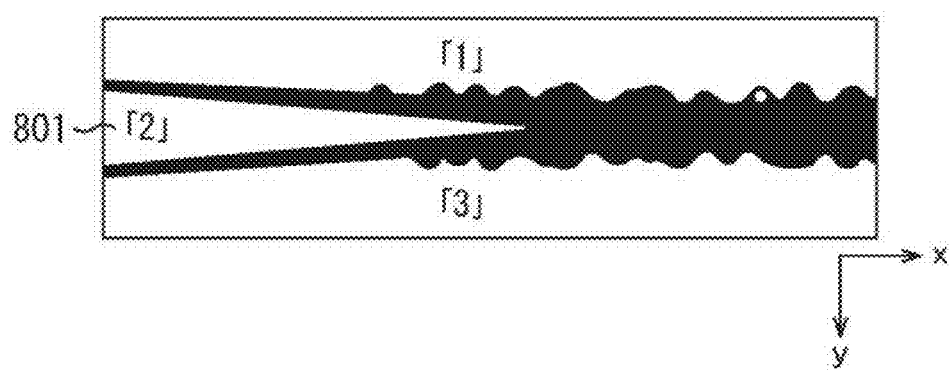
FIG. 9B is a drawing illustrating an example of an image that has been subject to labeling processing.

FIG. 9B is a pictorial representation of an example of a binarized image on which labeling processing has been performed.

The example illustrated in FIG. 9B illustrates a case in which three blobs are respectively assigned the label numbers 1, 2, and 3.

The labeling sections 104a and 104b are, for example, implemented by the CPU reading binarized image data, from the RAM or the like, performing labeling processing thereon, and temporarily storing the result, in the RAM, or the like.

Note that when the brightness level threshold values employed in the binarization sections 103a, 103b are the same as each other, the binarization sections 103a, 103b and the labeling sections 104a, 104b may respectively be configured by single sections.

Vee Convergence Point Derivation Section 105

Figure 9C:
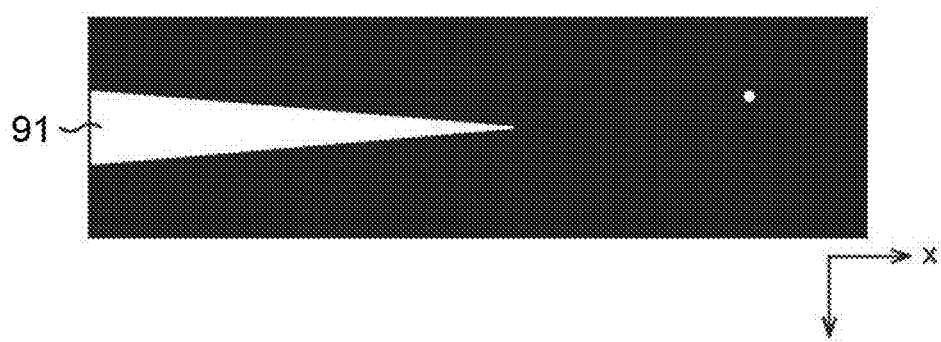
FIG. 9C is a drawing illustrating an example of an image that has been subject to blob extraction processing.
Figure 10:
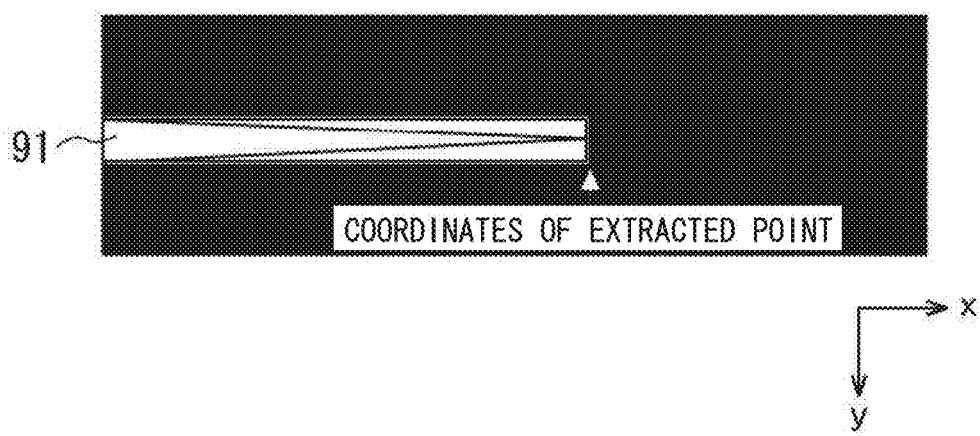
FIG. 10 is a pictorial representation illustrating an example of a detected Vee convergence point.

A Vee convergence point derivation section 105 determines whether or not, out of the blobs assigned label numbers by the labeling section 104b, any blobs have been extracted that match a specific condition. When the Vee convergence point derivation section 105 has determined that a blob matching the specific condition is present, that blob (the blob assigned the label number 2 in the example illustrated in FIG. 9B) is extracted as a Vee convergence region blob 91. The Vee convergence point derivation section 105 then acquires shape data, such as the coordinates and surface area, of the extracted Vee convergence region blob 91. FIG. 9C is a pictorial representation of an example of an extracted Vee convergence region blob 91. FIG. 10 is a pictorial representation of an example of a detected Vee convergence point $V_1$.

From the binarized image illustrated in FIG. 9A, the Vee convergence point derivation section 105, for example, extracts as the Vee convergence region blob 91 a blob that contacts the left end and has a specific surface area condition. The specific surface area condition may, for example, be set as a condition satisfying least one out of a condition such as a blob having a surface area with an actual dimension of from 15 $mm^2$ to 150 $mm^2$, or a condition of a rectangular block touching the outside of the blob with an actual dimension of from 25 $mm^2$ to 320 $mm^2$.

As illustrated in FIG. 10, the Vee convergence point derivation section 105 detects an x axis positive direction (steel plate 1 conveyance direction downstream direction) leading end of the Vee convergence region blob 91 as (the position of) the Vee convergence point $V_1$, the contact point.

In the present exemplary embodiment, when measuring the distance $\Delta L$ between the Vee convergence point $V_1$ and the welding point W offline in advance, the Vee convergence point derivation section 105 detects positions of the Vee convergence point $V_1$ for plural respective Vee convergence region images successively captured by the image capture device 5 over 3 sec. Since the image capture device 5 captures images at a frame rate of 500 fps, the Vee convergence point derivation section 105 detects the positions of 1500 individual Vee convergence points $V_1$. However, for example, when fluctuation in the Vee convergence point $V_1$ position is very small, the Vee convergence point derivation section 105 may detect the Vee convergence point $V_1$ derived from a single image (namely, the Vee convergence point $V_1$ need not necessarily be derived from respective plural images).

Moreover, during control of heat input to the steel plate 1, the Vee convergence point derivation section 105 is capable of detecting the position of the Vee convergence point $V_1$ for the plural respective Vee convergence region images successively captured by the image capture device 5 over 3 sec. However, the position of the Vee convergence point $V_1$ may be detected for a single Vee convergence region image captured by the image capture device 5.

Note that when the electric resistance welding operation management device 100 is controlling the heat input power to the steel plate 1, the Vee convergence point derivation section 105 may output an error message to an operator when a blob matching the specific condition is not extracted for a specific number of successive frames or greater.

The Vee convergence point derivation section 105 is implemented by, for example, the CPU reading the binarized image data that has been subjected to labeling processing, from the RAM or the like, deriving the Vee convergence point $V_1$ coordinates, and temporarily storing the result, in the RAM, or the like.

Geometric Vee Convergence Point Derivation Section 106

A geometric Vee convergence point derivation section 106 determines whether or not, out of the blobs assigned label numbers by the labeling section 104a, a blob matching the specific condition has been extracted. When the geometric Vee convergence point derivation section 106 determines that a blob matching the specific condition is present, that blob is extracted as the Vee convergence region blob 91. The geometric Vee convergence point derivation section 106 then acquires shape data such as the coordinates and surface area of the extracted Vee convergence region blob 91 (see FIG. 9B, FIG. 9C).

Note that when the electric resistance welding operation management device 100 is controlling the heat input to the steel plate 1, the geometric Vee convergence point derivation section 106 may output an error message to the operator when a blob matching the specific condition is not extracted for a specific number of successive frames or greater. The geometric Vee convergence point derivation section 106 may also utilize data of the Vee convergence region blob 91 extracted by the Vee convergence point derivation section 105.

Next, the geometric Vee convergence point derivation section 106 searches for regions in the extracted Vee convergence region blob 91 corresponding to the circumferential direction edge portions 11a, 11b of the steel plate 1.

Figure 9D:
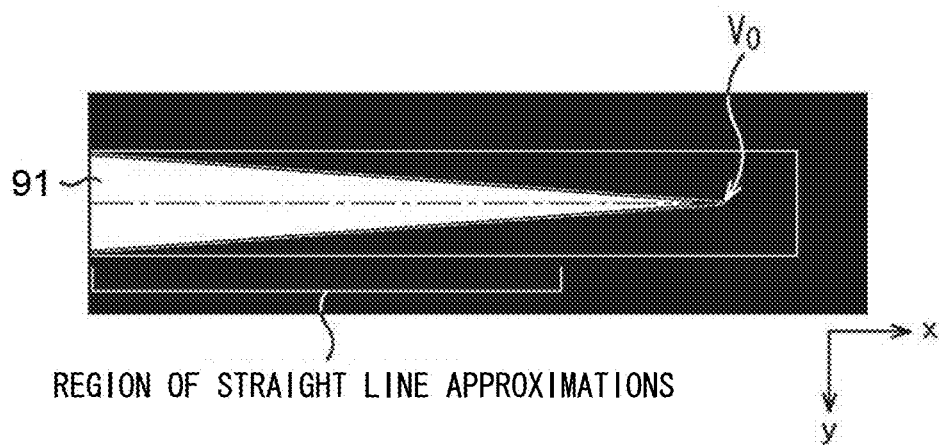
FIG. 9D is a drawing illustrating an image that has been subject to end portion search processing.

FIG. 9D is a pictorial representation of an example of the geometric Vee convergence point derivation section 106 searching for regions corresponding to the circumferential direction edge portions 11a, 11b of the steel plate 1.

As illustrated in FIG. 9D, the geometric Vee convergence point derivation section 106 performs search processing by searching for respective points, as the circumferential direction edge portions 11a, and 11b of the steel plate 1, where the pixel values change from 1 to 0 on progression along a y axis positive direction and a y axis direction negative direction from a straight line parallel to the x axis direction (the single-dotted dashed line in FIG. 9D) passing through the conveyance direction (x axis direction) furthest downstream point of the Vee convergence region blob 91 (the Vee convergence point $V_1$ detected by the Vee convergence point derivation section 105).

The geometric Vee convergence point derivation section 106 executes this search processing within a specific range in the V-shape convergence direction (x axis direction), for example, in the range from the left edge of the binarized image (the steel plate 1 conveyance direction upstream side) to the leading end of the Vee convergence region blob 91 (see the "straight line approximation region" in FIG. 9D), $2/3$ of the range from the left edge thereof. The geometric Vee convergence point derivation section 106 makes straight line approximations for the respective regions found corresponding to the circumferential direction edge portions 11a, 11b of the steel plate 1, and detects the intersection point of the straight line approximations as the geometric Vee convergence point $V_0$.

In the present exemplary embodiment, the geometric Vee convergence point derivation section 106 detects the geometric Vee convergence point $V_0$ for the same Vee convergence region images employed by the Vee convergence point derivation section 105 for detecting the Vee convergence point $V_1$ position.

Note that the specific range is not always "$2/3$ of the range from the left edge", but is preferably set at an appropriate value, for example set at a smaller value, such as "$1/2$ or the range from the left edge", when the geometric Vee convergence point $V_0$ position moves toward the steel plate 1 conveyance direction upstream side due to operating conditions.

When searching for regions corresponding to the circumferential direction edge portions 11a, 11b of the steel plate 1, configuration may, for example, be configured to search for the points where the pixel values change from 0 to 1 on progression toward the inside from the top and bottom positions of the image illustrated in FIG. 9D. However, it can be seen that the Vee convergence region blob 91 appears in the vicinity of the up-down direction (y axis direction) center of the image. Processing to start searching from the uppermost and lowermost positions in the image is therefore redundant. Accordingly, as described above, in the present exemplary embodiment processing time is reduced by searching for the points where the pixel values change from 1 to 0 on progression along the y axis positive direction and the y axis negative direction from the Vee convergence region blob 92 inside.

Moreover, the y axis direction positions of a wide portion of the Vee convergence region blob 91 (left edge of the image) may be ascertained from the labeling processing. Accordingly, also in cases in which searching is performed for the points where the pixel values change from 0 to 1 on progression toward the inside from upper and lower positions of the image, searching for the points where the pixel values change from 0 to 1 on progression toward the inside from the y axis direction positions at the wide portion of the blob 91, or the vicinity thereof, enables the processing time to be reduced.

The geometric Vee convergence point derivation section 106 is, for example, implemented by the CPU reading the binarized image data that has been subject to labeling processing, from the RAM or the like, deriving the geometric Vee convergence point $V_0$ coordinates, and temporarily storing the result, in the RAM, or the like.

Note that a method for deriving the position of the Vee convergence point $V_1$ and the position of the geometric Vee convergence point $V_0$ is, for example, described in the pamphlet of International Publication (WO) No. 2011/118560.

Welding Condition Determination Section 114

A welding condition determination section 114 determines whether or not the Vee convergence point $V_1$ position derived by the Vee convergence point derivation section 105 is present further to the steel plate 1 conveyance direction downstream side than the position of the geometric Vee convergence point $V_0$ derived by the geometric Vee convergence point derivation section 106. If the welding condition determination section 114 determines that the Vee convergence point $V_1$ position is present further to the steel plate 1 conveyance direction downstream side than the geometric Vee convergence point $V_0$ position, a determination signal indicating that the welding condition is the two-phased reduction of the Vee angle type 2 welding condition is supplied to a heat input controller 113.

The welding condition determination section 114 is, for example, implemented by the CPU reading the positions of the Vee convergence point $V_1$ and the geometric Vee convergence point $V_0$ for the steel plate 1 subject to heat input control, from the RAM or the like, and generating the determination signal based on these positions.

Welding Point Position Input Section 107

In order to measure the distance $\Delta L$ between the Vee convergence point $V_1$ and the welding point W offline in advance, a welding point position input section 107 inputs, based on input operation by an operator, welding point W position data visually decided by the operator from the plural respective Vee convergence region images successively captured by the image capture device 5 over 3 sec.

Explanation follows regarding an example of a method by which the operator decides the welding point W position.

Figure 13:
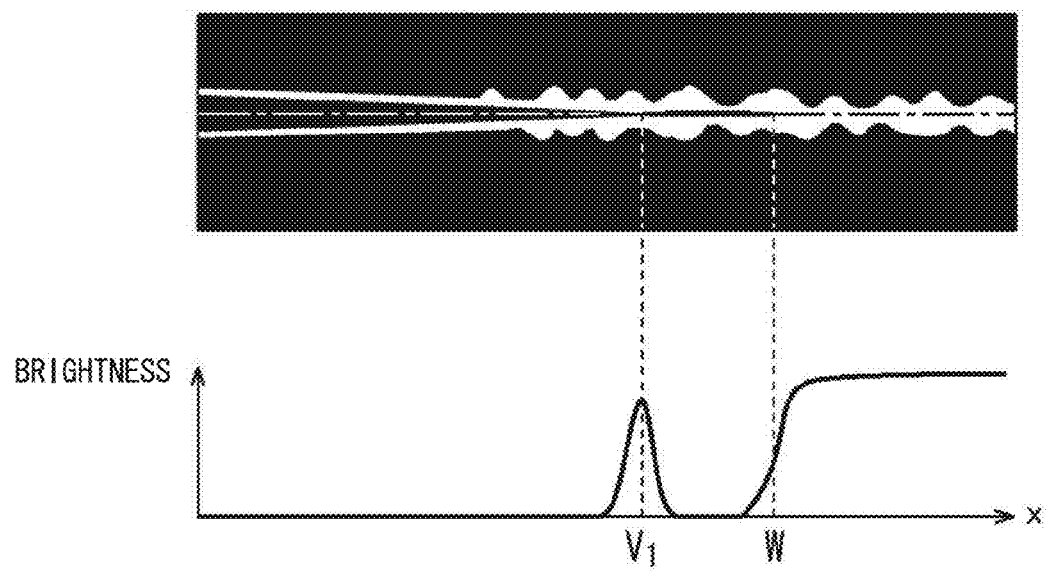
FIG. 13 is a drawing illustrating an example of an image captured by an image capture device, and x direction brightness distribution in the image.

The Vee convergence region images captured by the image capture device 5 give a brightness distribution such as illustrated in the upper part of FIG. 13, described later (for ease of illustration, in the upper part of FIG. 13, an image represented by black and white regions, however the image corresponding to the upper part of FIG. 13 is, for example, an image with 256 brightness gradations). The position of the slit end SE (the furthest downstream point of the welding slit S) is visually identified from the respective plural Vee convergence region images (1500 individual Vee convergence region images in the present exemplary embodiment). The slit is easily recognizable by eye since the brightness level of the slit is sufficiently lower than the brightness level of molten steel material portions (the brightness level of the slit is approximately 1/10 the brightness level of the molten steel material portions). Moreover, even in images where a discontinuous slit is observed, locations of a low brightness location running along the weld line from an upstream side slit toward the downstream direction in a narrow line shape, are recognizable as an intermittent slit. The slit and a scale pattern of molten steel material may accordingly be easily picked out from the Vee convergence region images, since the slit has a lower brightness level than the molten steel material and has a linear shape running along the weld line. The furthest downstream point of the positions of the identified slit end SE is derivable as the position of the welding point W.

Next, the operator uses an input device to input the electric resistance welding operation management device 100 with position data (coordinates) of the welding point W decided from the plural Vee convergence region images.

The welding point position input section 107 is, for example, implemented by the CPU acquiring the welding point W position data based on operation contents of the input device by the operator, and temporarily storing the acquired welding point W position data, in the RAM, or the like.

Distance $\Delta L$ Derivation Section 108, Distance $\Delta L$ Storage Section 109

A distance $\Delta L$ derivation section 108 derives, as the distance $\Delta L$ between the Vee convergence point and the welding point, the distance between the average position of the Vee convergence point $V_1$ derived by the Vee convergence point derivation section 105 for the plural respective Vee convergence region images successively captured over 3 sec by the image capture device 5, and the welding point W position input by the welding point position input section 107. The distance $\Delta L$ derivation section 108 moreover stores data of the derived distance $\Delta L$ in a distance $\Delta L$ storage section 109. In the present exemplary embodiment, distance $\Delta L$ derivation and storage is performed for each steel type.

The distance $\Delta L$ derivation section 108 is, for example, implemented by the CPU reading the Vee convergence point $V_1$ position and the welding point W position input by the welding point position input section 107, from the RAM or the like, deriving the distance $\Delta L$ between the Vee convergence point $V_1$ and the welding point W, and storing the result in the HDD, for example. The distance $\Delta L$ storage section 109 is, for example, implemented by the HDD.

Welding Point Position Derivation Section 110

When the Vee convergence point derivation section 105 has derived the Vee convergence point $V_1$ position of the steel plate 1 subject to heat input control, a welding point position derivation section 110 derives, as the welding point W position, a point at a position that is further, by the distance $\Delta L$ stored in the distance $\Delta L$ storage section 109, to the steel plate 1 conveyance direction downstream side (x axis positive direction) than the derived Vee convergence point $V_1$.

The welding point position derivation section 110 is, for example, implemented by the CPU reading the Vee convergence point $V_1$ position of the steel plate 1 that is subject to heat input control, from the RAM or the like, as well as reading the distance $\Delta L$ from the HDD, for example, deriving the welding point W position, and temporarily storing the derived welding point W position data, in the RAM, or the like.

Distance G Derivation Section 111

A distance G derivation section 111 derives, as the distance G between the welding point and the squeeze center position (see FIG. 3), the distance between the position of the welding point W on the steel plate 1, derived by the welding point position derivation section 110, and the squeeze center position C set in advance in the electric resistance welding operation management device 100.

The distance G derivation section 111 is, for example, implemented by the CPU reading the position of the welding point W on the steel plate 1 subject to heat input control, from the RAM or the like, reading the squeeze center position C from the HDD, for example, deriving the distance G, and temporarily storing data of the derived distance G, in the RAM, or the like.

Threshold Value Input Section 112

Based on an input operation by an operator, a threshold value input section 112 inputs and stores threshold value data for the distance G between the welding point W and the squeeze center position C.

As illustrated in FIG. 6, the defect area ratio of the steel plate 1 increases dramatically when the distance G is a given value (close to 27 mm in the example illustrated in FIG. 6), or shorter. Accordingly, for example, the value of the distance G at the position where the defect area ratio dramatically increases, in a "relationship between the defect area ratio and the distance G" measured in advance, may be employed as threshold value. Threshold values for the distance G are obtained for each steel type by identifying threshold values in this manner for each steel type.

The threshold value input section 112 is, for example, implemented by the CPU acquiring the threshold value data for the distance G based on operation contents of the input device by the operator, and storing the acquired threshold value data in the HDD, for example.

Heat Input Controller 113

If a welding condition has been determined to be a two-phased reduction of the Vee angle type 2 welding condition based on the determination signal supplied from the welding condition determination section 114, the heat input controller 113 reads the threshold value corresponding to the steel type subject to heat input control from the threshold values input from the threshold value input section 112. The heat input controller 113 then determines whether or not the distance G derived by the distance G derivation section 111 is the read threshold value, or shorter. If determined that the distance G is the threshold value, or shorter, the heat input controller 113, for example, restricts an upper limit value of the heat input power to the steel plate 1, and controls the power amount output from the high frequency power source 6, so as to lower the heat input power.

The heat input controller 113 is, for example, implemented by the CPU reading the distance G, from the RAM or the like, reading the threshold value for the distance G from the HDD, for example, comparing the read distance G and threshold value, and, based on the comparison result, transmitting a control signal to the high frequency power source 6 through the communication interface.

Note that the control method employed by the heat input controller 113 when the distance G is the threshold value, or shorter, is not limited to the method described above, as long as control is made to lower the heat input power.

Operation Flow Chart

Figure 11:
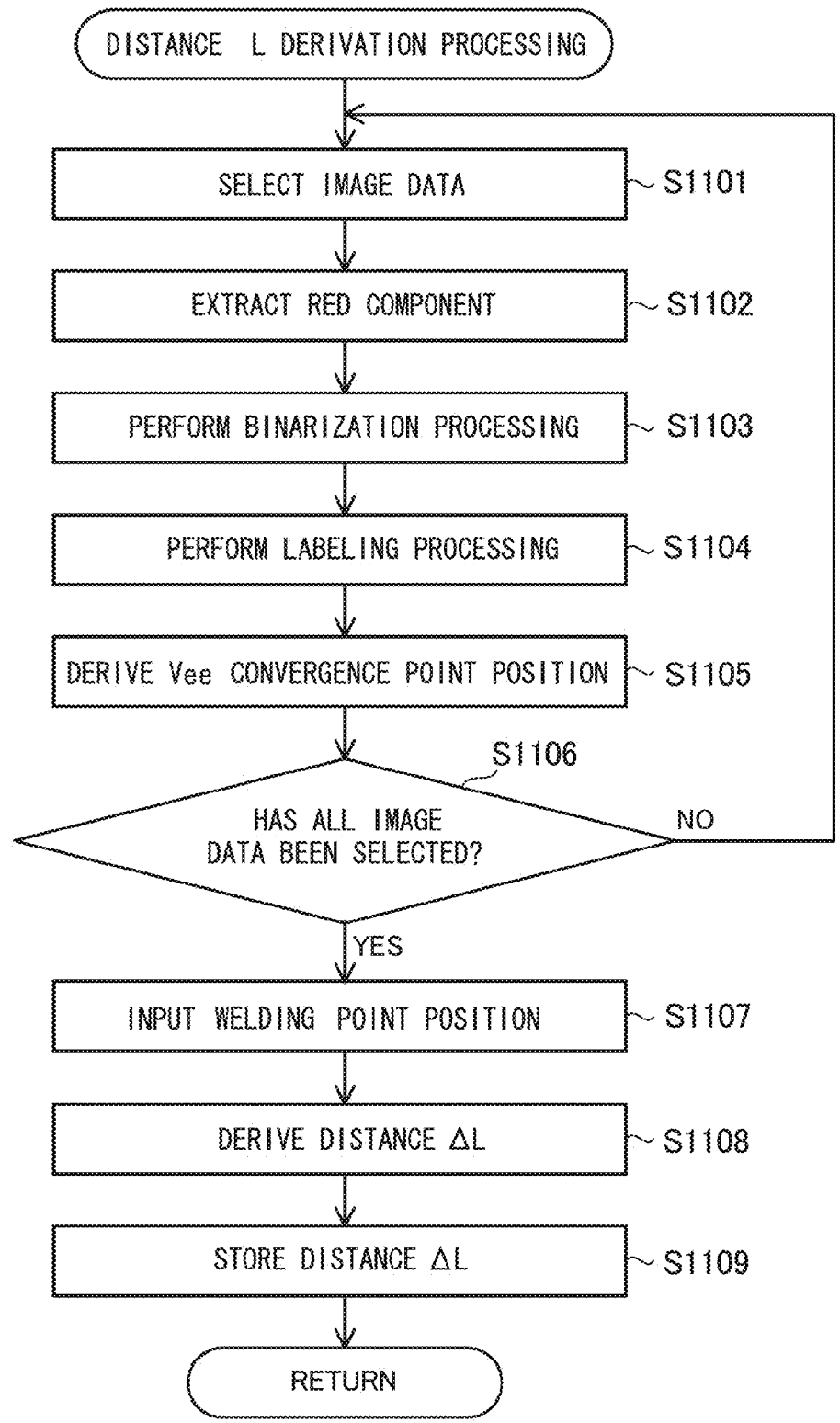
FIG. 11 is a flow chart to explain an example of distance ΔL derivation processing.

Explanation follows regarding an example of processing by the electric resistance welding operation management device 100 to derive the distance $\Delta L$ between the Vee convergence point $V_1$ and the welding point W (distance $\Delta L$ derivation processing), with reference to the flow chart of FIG. 11. The following explanation describes a case in which all the requisite image data to derive the distance $\Delta L$ has been input to the image data input section 101.

First, at step S1101, the image data input section 101 selects the "steel plate 1 Vee convergence region image data" for deriving the distance $\Delta L$ between the Vee convergence point $V_1$ and the welding point W, one at a time in sequence, for example from the earliest time-wise.

Next, at step S1102, the red component extraction section 102 extracts the red component (wavelengths of 590 nm to 680 nm) from the Vee convergence region image data selected at step S1101.

Next, at step S1103, the binarization section 103*b* binarizes (inverts) the red component image data obtained at step S1102.

Next, at step S1104, the labeling section 104*b* performs labeling processing to assign a label to each blob in the binarized image data obtained at step S1103.

Next, at step S1105, the Vee convergence point derivation section 105 extracts, as the Vee convergence region blob 91, a blob matching the specific condition out of the blobs assigned label numbers in the labeling processing of step S1104, and derives the Vee convergence point $V_1$, that is the contact point, from the extracted Vee convergence region blob 91.

Next, at step S1106, the Vee convergence point derivation section 105 determines whether or not all of the plural image data successively captured by the image capture device 5 over a specific duration (for example 3 sec) has been selected.

If the determination result is that the image data has not all been selected, processing returns to step S1101, and the processing of step S1101 to step S1106 is repeated until all of the image data has been selected.

Then, when the Vee convergence point $V_1$ position has been derived for all of the plural image data successively captured over the specific duration (for example 3 sec), processing proceeds to step S1107. At step S1107, based on input operation by the operator, the welding point position input section 107 inputs the acquired welding point W position data based on all of the plural image data successively captured over the specific duration (for example 3 sec).

Note that the processing of step S1107 may be performed prior to step S1101 to step S1106.

Next, at step S1108, the distance $\Delta L$ derivation section 108 respectively derives, as the distance $\Delta L$ between the Vee convergence point and the welding point, the distance between the average position of the Vee convergence point $V_1$ derived at step S1105 and the position of the welding point W input at step S1107, for the plural image data successively captured over the specific duration (for example 3 sec).

Next, at step S1109, the distance $\Delta L$ derivation section 108 stores the distance $\Delta L$ derived at step S1108 in the distance $\Delta L$ storage section 109. The distance $\Delta L$ derivation processing is then ended.

Figure 12:
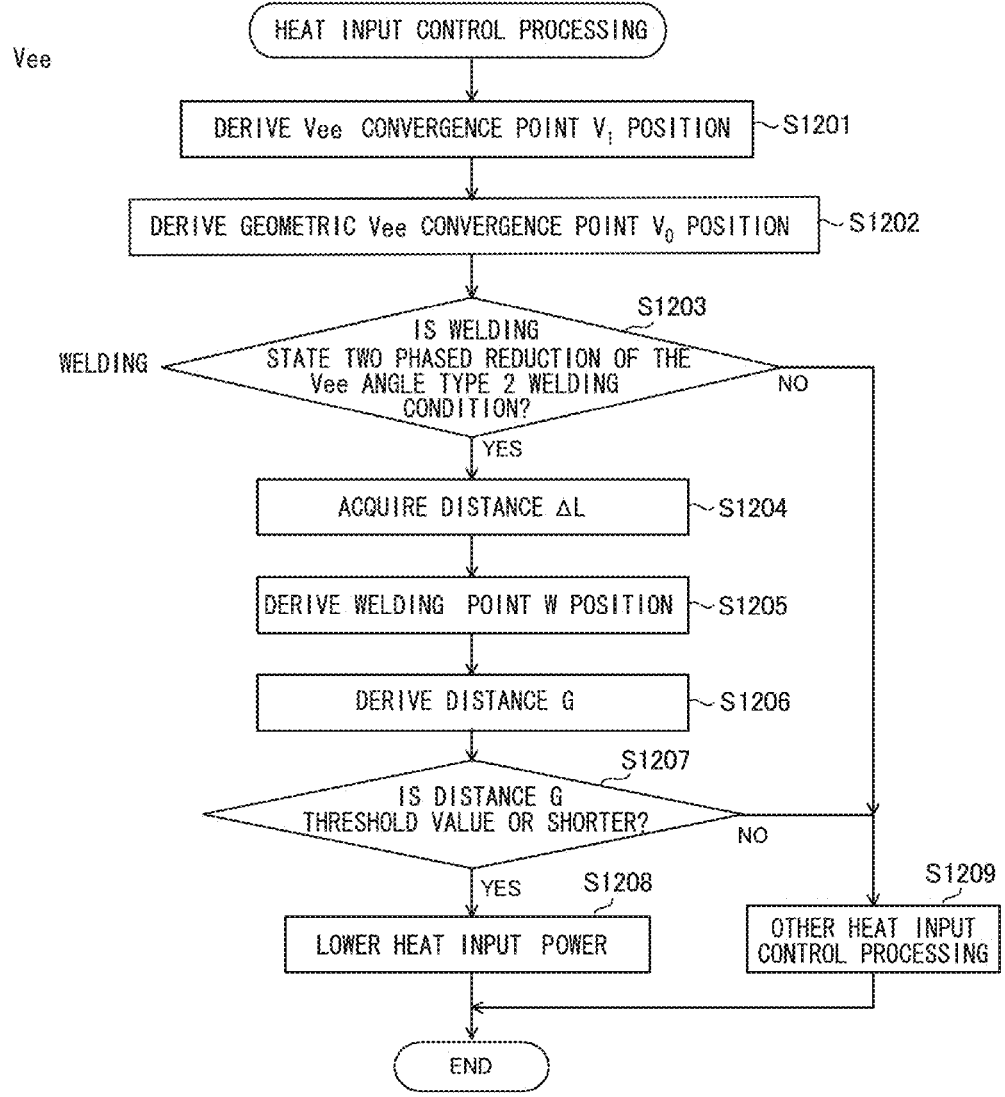
FIG. 12 is a flow chart to explain an example of heat input control processing.

Explanation next follows regarding an example of processing of the electric resistance welding operation management device 100 (heat input control processing) during control of heat input to the steel plate 1, with reference to the flow chart of FIG. 12. Note that the distance $\Delta L$ derivation processing described above is completed and the distance $\Delta L$ corresponding to the steel plate 1 subject to heat input control is stored in the distance $\Delta L$ storage section 109, prior to executing the heat input control processing.

First, at step S1201, the Vee convergence point derivation section 105 derives the position of the Vee convergence point $V_1$ of the steel plate 1 subject to heat input control. The position of the Vee convergence point $V_1$ of the steel plate 1 subject to heat input control is, for example, derived by performing processing similar to the processing of step S1102 to step S1106 in FIG. 11 on image data of the steel plate 1 subject to heat input control.

Next, at step S1202, the geometric Vee convergence point derivation section 106 derives the position of the geometric Vee convergence point $V_0$ of the steel plate 1 subject to heat input control.

Next, at step S1203, the welding condition determination section 114 determines whether or not the welding condition is the two-phased reduction of the Vee angle type 2 welding condition based on the Vee convergence point $V_1$ position derived at the earlier step S1201 and the geometric Vee convergence point $V_0$ position derived at the earlier step S1202. The welding condition determination section 114 determines that the welding condition is the two-phased reduction of the Vee angle type 2 welding condition if the Vee convergence point $V_1$ position is present further to the steel plate 1 conveyance direction downstream side than the geometric Vee convergence point $V_0$ position. Processing proceeds to step S1204 if the welding condition determination section 114 has determined the welding condition to be the two-phased reduction of the Vee angle type 2 welding condition. Processing proceeds to step S1209 if the welding condition is determined not to be the two-phased reduction of the Vee angle type 2 welding condition.

Next, at step S1204, the welding point position derivation section 110 acquires the distance ΔL between the Vee convergence point $V_1$ and the welding point W of the steel plate 1 subject to heat input control, that is stored in the distance ΔL storage section 109.

Next, at step S1205, the welding point position derivation section 110 derives, as the position of the welding point W of the steel plate 1 subject to heat input control, a position at a separation of the distance ΔL acquired at step S1204 on the steel plate 1 conveyance direction downstream side (x axis positive direction) of the Vee convergence point $V_1$ position acquired at step S1201.

Next, at step S1206, the distance G derivation section 111 derives the distance G between the welding point W and the squeeze center position C, from the welding point W position derived at step S1205 and the squeeze center position C that is set in advance.

Next, at step S1207, the heat input controller 113 determines whether or not the distance G derived at step S1206 is the threshold value corresponding to the steel type subject to heat input control, or shorter.

Processing proceeds to step S1208 if the heat input controller 113 has determined the distance G to be the threshold value, or shorter. At step S1208, the heat input controller 113 restricts the upper limit value of the heat input power, and controls the power amount output from the high frequency power source 6, so as to lower the heat input power. Heat input control processing is then ended.

However, processing proceeds to step S1209 if, at step S1206, the heat input controller 113 determines that the distance G derived at step S1206 is not the threshold value, or shorter. At step S1209, the heat input controller 113 performs other heat input control processing. The other heat input control processing is, for example, processing to control the power amount output from the high frequency power source 6 so as to raise the heat input power when the welding condition is the type 1 welding condition or the type 2 welding condition. Heat input control processing is then ended.

SUMMARY

Based on the finding that when a welding condition is the two-phased reduction of the Vee angle type 2 welding condition, the distance ΔL between the Vee convergence point $V_1$ and the welding point W stays substantially the same regardless of the heat input power imparted to the steel plate 1 and the thickness (plate thickness) of the steel plate 1, in the electric resistance welding operation management device 100 according to the present exemplary embodiment, the distance ΔL between the Vee convergence point $V_1$ and the welding point W when the welding condition is the two-phased reduction of the Vee angle type 2 welding condition is derived offline in advance and stored. The electric resistance welding operation management device 100 moreover automatically derives the position of the Vee convergence point $V_1$ of the steel plate 1 subject to heat input control from the Vee convergence region images of the steel plate 1 subject to heat input control, and derives the position of the welding point W of the steel plate 1 subject to heat input control based on the derived position of the Vee convergence point V1 and the distance ΔL that has been stored in advance.

Based on the finding that when the distance G between the welding point W and the squeeze center position C is the threshold value, or shorter, insufficient transmission of pressing force to the welding faces means that oxide developing at the welding faces is not externally discharged, lowering weld quality, the electric resistance welding operation management device 100 derives the distance G between the welding point W and the squeeze center position C, from the position of the welding point W on the steel plate 1 subject to heat input control and the squeeze center position C that has been set in advance. If the derived distance G is the threshold value, or shorter for the steel type of the steel plate 1 subject to heat input control, the electric resistance welding operation management device 100 restricts the upper limit value of the heat input power to the steel plate 1, and controls the power amount output from the high frequency power source 6 so as to lower the heat input power.

Accordingly, the heat input to make the welding condition the two-phased reduction of the Vee angle type 2 welding condition is controllable using the distance G as a guide. The electric resistance welding operation management device 100 of the present exemplary embodiment is accordingly able to control the heat input power to make the welding condition the two-phased reduction of the Vee angle type 2 welding condition more easily and more reliably than hitherto.

Modified Examples

In the above exemplary embodiment, heat input is controlled based on the result of comparing the distance G between the welding point W and the squeeze center position C against the threshold value; however, this is not always necessary. For example, a distance between the position of the welding point W on the steel plate 1 subject to heat input control and a fixed position to the steel plate 1 conveyance direction downstream side of the welding point W other than the squeeze center position C may be employed in place of the distance G.

Moreover, instead of such a distance, heat input may be controlled from the position of the welding point W on the steel plate 1 subject to heat input control. For example, the high frequency power source 6 may be controlled so as to lower the heat input if the welding point W on the steel plate 1 subject to heat input control is positioned to the steel plate 1 conveyance direction downstream side of a specific fixed position.

Namely, heat input may be controlled based on the "the position of the welding point W on the steel plate 1 subject to heat input control" derived from the position of the Vee convergence point $V_1$ obtained from the Vee convergence region images and the distance ΔL.

Moreover, in the present exemplary embodiment, the distance ΔL between the Vee convergence point and the welding point (the distance between the welding point W and the Vee convergence point $V_1$) is set as the distance between the average position of the Vee convergence point $V_1$ and the welding point W in the plural Vee convergence region images captured over a longer duration than the fluctuation cycle of the Vee convergence point $V_1$ position. However, the distance ΔL may be any value as long as it is a value representing the distance between the welding point W and the Vee convergence point $V_1$.

For example, a distance of a specific multiple of (such as twice) the aforementioned distance between the average position of the Vee convergence point $V_1$ and the welding point W may be set as the distance ΔL between the Vee convergence point and the welding point.

Moreover, the distance ΔL between the Vee convergence point and the welding point may be set as a distance between the Vee convergence point $V_1$ and the welding point W from plural Vee convergence region images captured over a duration longer than the fluctuation cycle of the position of the Vee convergence point $V_1$ and the fluctuation cycle of the x axis direction length of the welding slit S, with the distance ΔL added to the Vee convergence point $V_1$ or to the average value of the Vee convergence points $V_1$.

Moreover, the distance ΔL between the Vee convergence point and the welding point may be stored in the distance ΔL storage section 109 for each type of steel plate 1. In such cases, the distance ΔL corresponding to the steel type of the steel plate 1 subject to heat input control may be read from the distance ΔL storage section 109 and employed to derive the distance G.

The electric resistance welding operation management device 100 need not necessarily control the high frequency power source 6. For example, to inform the operator, the welding point position derivation section 110 may display the position of the welding point W of the steel plate 1 subject to heat input control on a display screen, or the distance G derivation section 111 may display the distance G of the steel plate 1 subject to heat input control on a display screen or the like. In such cases, the operator may instruct the high frequency power source 6 to change to a target heat input based on the displayed data.

Second Exemplary Embodiment

Explanation follows regarding a second exemplary embodiment of the present invention. In the first exemplary embodiment described above, an example is explained in which the position of the welding point W is decided visually by the operator to measure the distance ΔL offline in advance. In contrast thereto, in the second exemplary embodiment, the position of the welding point W is decided automatically using image processing of Vee convergence region images successively captured over 3 sec by the image capture device 5. The second exemplary embodiment thus mainly differs from the first exemplary embodiment in the method of deciding the position of the welding point W employed to measure the distance ΔL offline in advance. Accordingly, in the explanation of the second exemplary embodiment, similar portions to the first exemplary embodiment, for example, employ the same reference numerals as FIG. 1 to FIG. 12, and detailed explanation thereof is omitted.

FIG. 13 illustrates an example of an image captured by the image capture device 5, and a brightness distribution along the x axis direction (steel plate 1 conveyance direction) in the image. Note that the upper part of FIG. 13 is a pictorial representation of an image at the point in time when growth of the welding slit S has ended (as mentioned above, for ease of illustration, in the upper part of FIG. 13, the image is represented by black and white regions, however the image corresponding to the upper part of FIG. 13 is, for example, an image with 256 brightness gradations). The lower part of FIG. 13 illustrates a brightness distribution on a straight line parallel to the x axis direction (see the single-dotted dashed line in the image in FIG. 13) passing through the Vee convergence point $V_1$.

Figure 14:
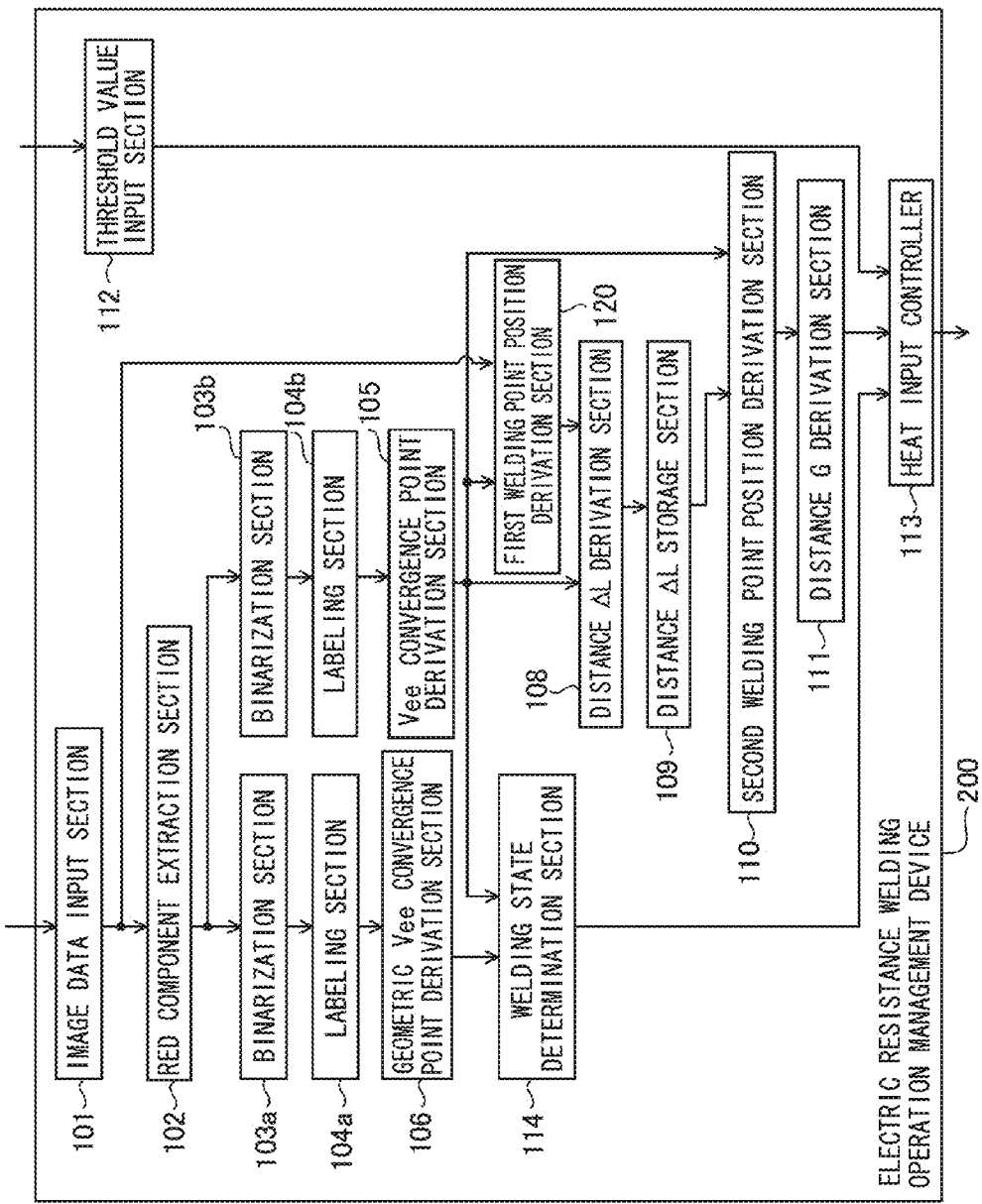
FIG. 14 is a drawing illustrating an example of a functional configuration of an electric resistance welding operation management device according to a second exemplary embodiment of the present invention.

FIG. 14 illustrates an example of a functional configuration of an electric resistance welding operation management device 200 according to the second exemplary embodiment.

A first welding point position derivation section 120, for example, searches an image input from the image data input section 101 for changes in brightness passing the Vee convergence point $V_1$ derived by the Vee convergence point derivation section 105, and along a straight line parallel to the x axis direction (see the single-dotted dashed line in the upper part of FIG. 13), and also derives a position of the largest brightness change (such as differential values) downstream from the Vee convergence point $V_1$ position as the position of the slit end SE. The first welding point position derivation section 120 performs this image processing on each of the plural Vee convergence region images successively captured over 3 sec by the image capture device 5.

For the plural respective Vee convergence region images successively captured over 3 sec by the image capture device 5, the first welding point position derivation section 120 moreover, for example, derives an average position of the Vee convergence point $V_1$ derived by the Vee convergence point derivation section 105, and also derives, as the position of the welding point W, the position of the furthest downstream point of the slit end SE from out of the slit ends SE derived as described above. The distance ΔL derivation section 108 then derives, as the distance ΔL between the Vee convergence point and the welding point, the distance between the average position of the Vee convergence point $V_1$ and the welding point W position derived by the first welding point position derivation section 120.

In the electric resistance welding operation management device 200 according to the second exemplary embodiment, the welding point position input section 107 according to the first exemplary embodiment and illustrated in FIG. 7 is rendered unnecessary. In place of the welding point position input section 107, the first welding point position derivation section 120 that derives the position of the welding point W based on data from the image data input section 101 and the Vee convergence point derivation section 105, and that outputs data of the derived welding point W position to the distance ΔL derivation section 108, is added to the electric resistance welding operation management device 100 according to the first exemplary embodiment.

Moreover, in place of the processing of step S1107 illustrated in FIG. 11, processing is performed to derive the position of the welding point W for measuring the distance ΔL offline in advance from the position of the furthest downstream point of the slit end, as described above.

Moreover, in the electric resistance welding operation management device 200 according to the second exemplary embodiment, a second welding point position derivation section 110 includes substantially the same functions as the welding point position derivation section 110 according to the first exemplary embodiment. The second welding point position derivation section 110 derives the position of the welding point of the steel plate 1 subject to heat input control based on the distance ΔL stored in the distance ΔL storage section 109 and the position of the Vee convergence point derived by the Vee convergence point derivation section 105. Namely, in the electric resistance welding operation management device 200 according to the second exemplary embodiment, the first welding point position derivation section 120 derives the position of the welding point W for deriving the distance ΔL offline, and the second welding point position derivation section 110 derives the position of the welding point W for controlling the heat input power to the steel plate 1 online.

In the electric resistance welding operation management device 200 according to the second exemplary embodiment, in addition to the advantageous effects explained in the first exemplary embodiment, the distance ΔL between the Vee convergence point V₁ and the welding point W are automatically derivable, enabling the burden on an operator to be reduced. The distance ΔL is moreover derivable for the steel plate 1 subject to heat input control. With such a configuration, there is no longer a need to measure the distance ΔL offline. As described above, the distance ΔL remains substantially the same regardless of the heat input and the thickness (plate thickness) of the steel plate 1, however strictly speaking, it is not exactly the same. Accordingly, deriving the distance ΔL for the steel plate 1 subject to heat input control enables a more accurate distance ΔL to be derived.

Note that the various modified examples explained with reference to the first exemplary embodiment may also be applied to the present exemplary embodiment.

Third Exemplary Embodiment

New Findings Obtained by the Inventors

The inventors found that in the two-phased reduction of the Vee angle type 2 welding condition, the position of the steel plate 1 conveyance direction furthest downstream point of the welding slit S is the same as the welding point W. As described above, the position of the slit end SE fluctuates periodically. In the present exemplary embodiment, the position of the slit end SE at the steel plate 1 conveyance direction furthest downstream point is derived as the position of the welding point W from the slit ends SE respectively obtained from the plural Vee convergence region images successively captured by the image capture device 5 over a specific period of time (such as a period of time of 250 msec or above), under conditions of an image capture frame rate of 40 fps, an exposure time of 1/5000 secs, or shorter (such as 1/10000 sec).

The inventors also found that there is a high likelihood of the slit end SE of the welding slit S being present at either the Vee convergence point V₁ position or the welding point W position (the position of the welding slit S when it has extended).

As described above, the fluctuation cycle of the slit end SE is several msec. Hitherto, it has therefore been considered that the welding point W (the furthest downstream point of the periodically fluctuating slit end SE) cannot be captured without employing a high-speed camera with a frame rate of 200 fps or above. It is difficult to perform real-time processing on all of the Vee convergence region images captured at such a frame rate with current general computer processing capabilities. It is accordingly considered difficult to derive the welding point W position in real-time (online).

However, as a result of investigating changes of the "positions of the Vee convergence point V₁ and the slit end SE" over time in the two-phased reduction of the Vee angle type 2 welding condition, the inventors found that, since there is a high likelihood of the slit end SE being present at either the Vee convergence point V₁ position or the welding point W position (the position of the welding slit S when it has extended), setting the exposure time to 1/5000 sec, or shorter, enables the welding point W to be reliably captured even with an image capture device with a frame rate of 200 fps or lower (for example 40 fps).

FIG. 15 illustrates an example of transitions over time in the geometric Vee convergence point V₀, the Vee convergence point V₁, and the slit end SE detected from each of plural images successively captured over 3 sec in a case in which the welding condition of a steel plate 1 is the two-phased reduction of the Vee angle type 2 welding condition. The horizontal axis in FIG. 15 shows time with an image capture start timing at 0 (zero). In the present exemplary embodiment, the frame rate is set at 40 fps, such that 120 Vee convergence region images are obtained in the 3 sec interval from the image capture start time point. The graph of FIG. 15 is obtained by plotting the x axis direction positions (detection positions) of the geometric Vee convergence point V₀, the Vee convergence point V₁, and the slit end SE with a specific position set as a reference (0 (zero)) for each of the 120 Vee convergence region images, and then connecting together (performing linear interpolation thereon).

As illustrated in FIG. 15, even at a frame rate of 40 fps, fluctuations over time of the position of the slit end SE can be captured, and the position of the slit end SE at the conveyance direction furthest downstream point (toward the top in the graph of FIG. 15) of steel plate 1 is derivable for constant periods of time. The position of the furthest downstream point of the slit end SE corresponds to the welding point W, and the graph of FIG. 15 represents a welding condition that is the two-phased reduction of the Vee angle type 2 welding condition.

As described above, the fluctuation cycle of the slit end SE position is several msec, and it can be seen from the results in FIG. 15 that there is a high likelihood of the slit end SE being present either at the Vee convergence point V₁ position or at the position of the furthest downstream point (the position corresponding to the welding point W). Accordingly, by setting an exposure time of 1/5000 sec, or shorter, it is possible to capture the position of the welding point W when the welding condition is the two-phased reduction of the Vee angle type 2 welding condition, even at a frame rate of 40 fps. The position of the welding point W is accordingly successively (substantially in real-time) detectable using image processing.

As described above, the inventors found that in the two-phased reduction of the Vee angle type 2 welding condition, the furthest steel plate 1 conveyance direction downstream position of the slit end SE is the same as the welding point W, found that the defects included in the welding portion increase when the distance G between the welding point W and the squeeze center position C is a threshold value, or shorter, and also found that the position of the welding point W is successively detectable (substantially in real-time) using image processing.

Based on these findings, the inventors found out how to detect the steel plate 1 welding point W online, and control the heat input power (the power amount output from the high frequency power source 6) to the steel plate 1. Explanation follows regarding an electric resistance welding operation management device 300 according to a third exemplary embodiment.

Electric Resistance Welding Operation Management Device 300 Function

Detailed explanation follows regarding functions included in the electric resistance welding operation management device 300 according to the third exemplary embodiment.

FIG. 16 illustrates an example of a functional configuration of the electric resistance welding operation management device 300 according to the third exemplary embodiment. The electric resistance welding operation management device 300 may, for example, be implemented by a data processing device provided with a CPU, ROM, RAM, a HDD and various interfaces.

In the electric resistance welding operation management device 300 according to the present exemplary embodiment, an image data input section 101, a red component extraction section 102, binarization sections 103a and 103b, labeling sections 104a and 104b, a geometric Vee convergence point derivation section 106, a Vee convergence point derivation section 105, a distance G derivation section 111, a threshold value input section 112, a heat input controller 113 and a welding condition determination section 114 are respectively the same as those of the electric resistance welding operation management device 100 according to the first exemplary embodiment, and so explanation thereof is omitted.

Search Region Setting Section 201

A search region setting section 201 sets a slit end SE search region in the red component image data obtained from the red component extraction section 102. The slit end SE search region is a region for searching for the slit end SE.

Figure 17A:
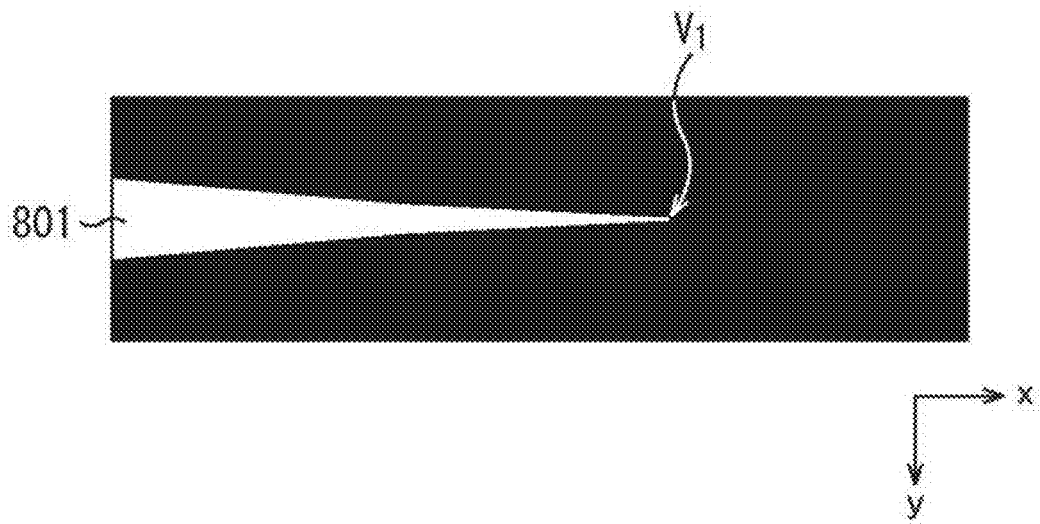
FIG. 17A is a pictorial representation illustrating an example of a manner in which a Vee convergence point has been detected.
Figure 17B:
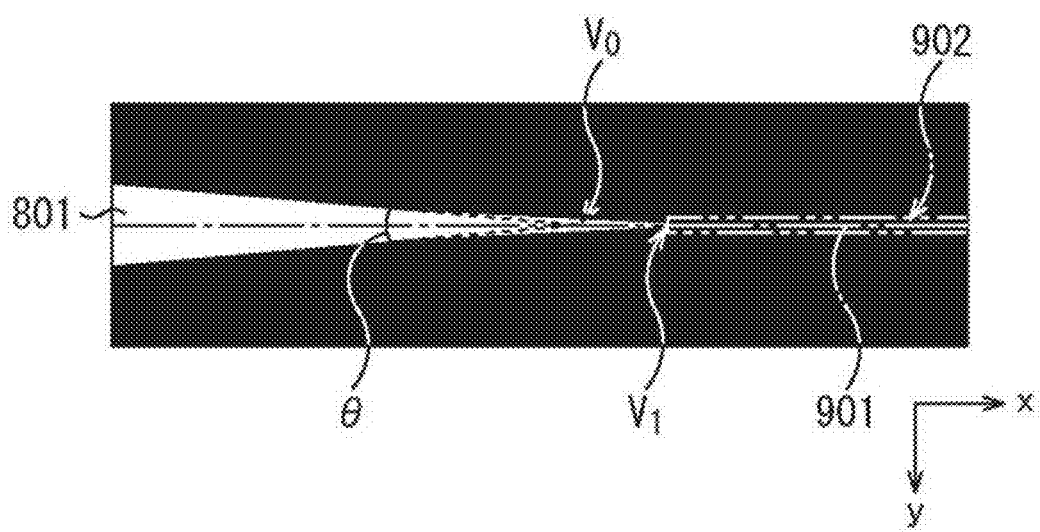
FIG. 17B is a pictorial representation illustrating an example in which a geometric Vee convergence point has been detected and a slit end search region has been set.

Since the slit end SE is present on the weld line 12, to set the slit end SE search region, the search region setting section 201 first derives, as an estimated weld line 12 position, a bisector 901 of Vee convergence angle θ (see the single-dotted dashed line in FIG. 17B) of the angle θ formed by straight line approximations of regions corresponding to the circumferential direction edge portions 11a, 11b of the steel plate 1 (see the intermittent lines in FIG. 17B). The weld line estimated as the bisector 901 of the Vee convergence angle θ is referred to as the "estimated weld line", as appropriate. Note that the straight line approximations intersect at the geometric Vee convergence point $V_O$ derived by the geometric Vee convergence point derivation section 106.

Next, the search region setting section 201 sets a rectangular region encompassing the estimated weld line as a search region 902 for the slit end SE. The search region 902 for the slit end SE is set with the Vee convergence point $V_1$ as the upstream end, the downstream end of the image as the downstream end, and with a width extending a specific distance D from the bisector 901 of the Vee convergence angle θ in both the y axis positive direction and negative direction (see FIG. 18B regarding the distance D). Note that the value of the distance D is set in advance as an appropriate value greater than 0 (zero).

As described above, the welding slit S extends from a base point of the Vee convergence point $V_1$ toward the steel plate 1 conveyance direction (x axis direction) downstream side. The slit end SE at the furthest downstream point of the welding slit S does not stray significantly from the bisector 901 of the Vee convergence angle θ. There is, however, a possibility of the slit end SE not being positioned exactly on the bisector 901 of the Vee convergence angle θ. Moreover, since noise 703 (see FIG. 18A) is sometimes included in the Vee convergence region images, setting an excessively wide slit end SE search range necessitates determination of whether or not the noise 703 is the slit end SE. The value of the distance D is set appropriately from these perspectives, and the distance D is set at 1 mm in the present exemplary embodiment.

The search region setting section 201 is, for example, implemented by the CPU reading the binarized image data that has been subjected to labeling processing, geometric Vee convergence point $V_O$ coordinates, and Vee convergence point $V_1$ coordinates, from the RAM or the like, deriving coordinates to define the search region 902 for the slit end SE, and temporarily storing the result thereof, in the RAM, or the like.

Search Region Binarization Section 202

Figure 18A:
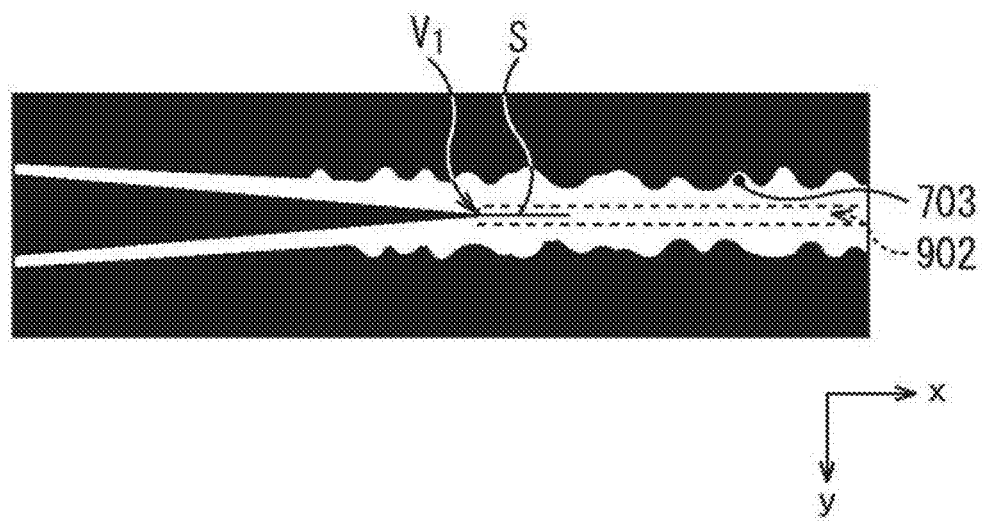
FIG. 18A is a drawing illustrating a red component image to which a slit end search region has been applied.

A search region binarization section 202 extracts data of the search region 902 for the slit end SE set by the search region setting section 201, from the red component image data obtained by the red component extraction section 102. FIG. 18A is a pictorial representation of an example of a red component image applied with the search region 902 for the slit end SE.

Figure 18B:
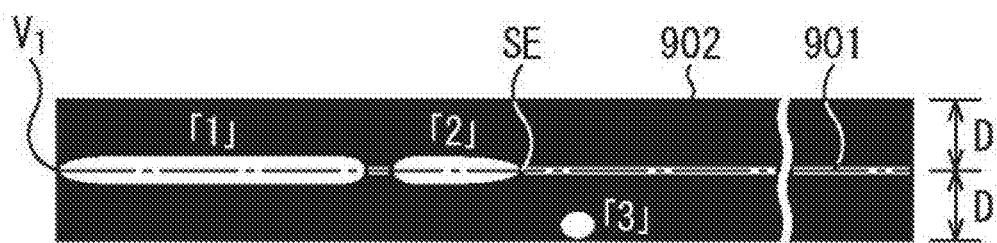
FIG. 18B is a pictorial representation illustrating an example of a binarized image in a slit end search region.

The search region binarization section 202 then binarizes (inverts) the red component image data of the extracted slit end SE search region 902. When this is performed, the search region binarization section 202 assigns a pixel value of 0 to pixels with a brightness level of a threshold value or above, and assigns a pixel value of 1 to pixels with a brightness level below the threshold value. FIG. 18B is a pictorial representation of an example of a binarized image of the search region 902 for the slit end SE.

Since the welding slit S is long and narrow, there is a concern that a high brightness level threshold value leads to the possibility of becoming unable to appropriately extract the welding slit S with binarization processing. Accordingly, in the present exemplary embodiment, in order to enable reliable extraction of the welding slit S, the brightness level threshold value employed by the search region binarization section 202 is set lower than the brightness level threshold values employed by the binarization sections 103a, 103b. Note that since the binarization sections 103a, 103b employ higher threshold values, the welding slit S does not appear in the binarized image illustrated in FIG. 9A.

The search region binarization section 202 is, for example, implemented by the CPU reading the red component image data and the coordinates for defining the search region 902 for the slit end SE, from the RAM or the like, performing binarization processing on the red component image data within the search region 902 for the slit end SE, and temporarily storing the binarized image data, in the RAM, or the like.

Search Region Labeling Section 203

A search region labeling section 203 performs labeling processing to assign labels to each blob within the search region 902 for the slit end SE on the binarized image obtained from the search region binarization section 202. In the example illustrated in FIG. 18B, three blobs are respectively assigned the label numbers 1, 2, and 3.

The search region labeling section 203 is, for example, implemented by the CPU reading the binarized image data for the search region 902 for the slit end SE, from the RAM or the like, performing labeling processing thereon, and temporarily storing the result, in the RAM, or the like.

Slit End Position Derivation Section 204, Slit End Position Storage Section 205

A slit end position derivation section 204 derives the aspect ratio (horizontal direction blob length/vertical direction blob length) for each blob assigned a label number by the search region labeling section 203. The slit end position derivation section 204 also determines whether or not any blobs are present with an aspect ratio below a threshold value. As described above, the welding slit S lengthens and shortens along the steel plate 1 conveyance direction (x axis direction), and so there is a strong possibility of blobs corresponding to the welding slit S having a longer horizontal direction (x axis direction) length than the vertical direction (y axis direction) length, while there is a strong possibility that blobs with a longer vertical direction (y axis direction) length than horizontal direction (x axis direction) length are blobs corresponding to noise. The aspect ratio threshold value is set from this perspective (the perspective of eliminating noise within the search region 902 for the slit end SE), and in the present exemplary embodiment, the blob aspect ratio threshold value is set at ½.

In the example illustrated in FIG. 18B, the blob assigned the label number 3 is regarded as noise, and discarded as a slit end SE search target.

If the slit end position derivation section 204 has determined that, out of the blobs with an aspect ratio below the threshold value, there are blobs with an aspect ratio below the threshold value present, the slit end position derivation section 204 derives the coordinates of the point of the furthest downstream point of the blob that is furthest downstream in the steel plate 1 conveyance direction as the coordinates (position) of the slit end SE, and stores them in the slit end position storage section 205.

However, if the slit end position derivation section 204 has determined that there are no blobs present with an aspect ratio below the threshold value, the slit end position derivation section slit end position derivation section 204 derives the coordinates of the Vee convergence point $V_1$ derived by the Vee convergence point derivation section 105 as the coordinates of the slit end SE, and stores them in the slit end position storage section 205.

In the example illustrated in FIG. 18B, the blob assigned the label number 1 and the blob assigned the label number 2 are blobs with an aspect ratio below the threshold value. Out of these blobs, the blob assigned the label number 2 is the blob that is furthest downstream in the steel plate 1 conveyance direction, and so the slit end position derivation section 204 derives the point of the furthest downstream point of the blob assigned the label number 2 as the slit end SE.

Note that the slit end position derivation section 204 may be configured to derive the coordinates of the slit end SE by connecting together blobs with an aspect ratio below the threshold value.

In the present exemplary embodiment, the slit end position derivation section 204 derives slit end SE coordinates for the same respective Vee convergence region images as those used by the Vee convergence point derivation section 105 when detecting the position of the Vee convergence point $V_1$.

The slit end position derivation section 204 is, for example, implemented by the CPU reading the binarized image data of the search region 902 for the slit end SE that has been subject to labeling processing, from the RAM or the like, deriving the slit end SE coordinates, and storing the derived slit end SE coordinates in the slit end position storage section 205, configured by, RAM or the like.

Welding Point Position Derivation Section 206

A welding point position derivation section 206 actuates when slit end SE coordinates, obtained in image group units of the Vee convergence region successively captured over 3 sec by the image capture device 5 as described above, have been obtained for each of the Vee convergence region images included in a Vee convergence region image group.

Out of the slit end SE coordinates derived for each Vee convergence region image by the slit end position derivation section 204, the welding point position derivation section 206 extracts the coordinates that are furthest downstream in the steel plate 1 conveyance direction, and derives the extracted coordinates as the coordinates (position) of the welding point W.

The welding point position derivation section 206 is, for example, implemented by the CPU reading the slit end SE coordinates, from the RAM or the like, deriving the welding point W of the steel plate 1, and storing the welding point W of the steel plate 1, in the RAM or the like.

Operation Flow Chart

Figure 19B:
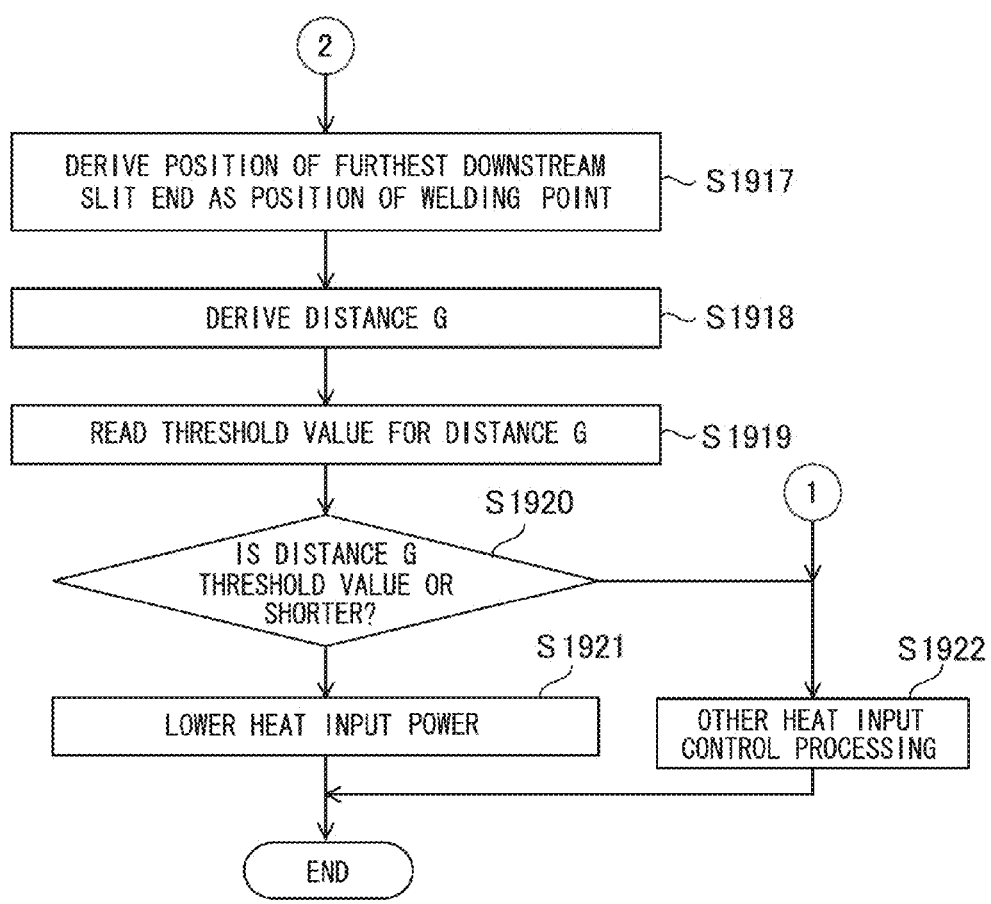
FIG. 19B is a flow chart to explain an example of heat input control processing.
Figure 20:
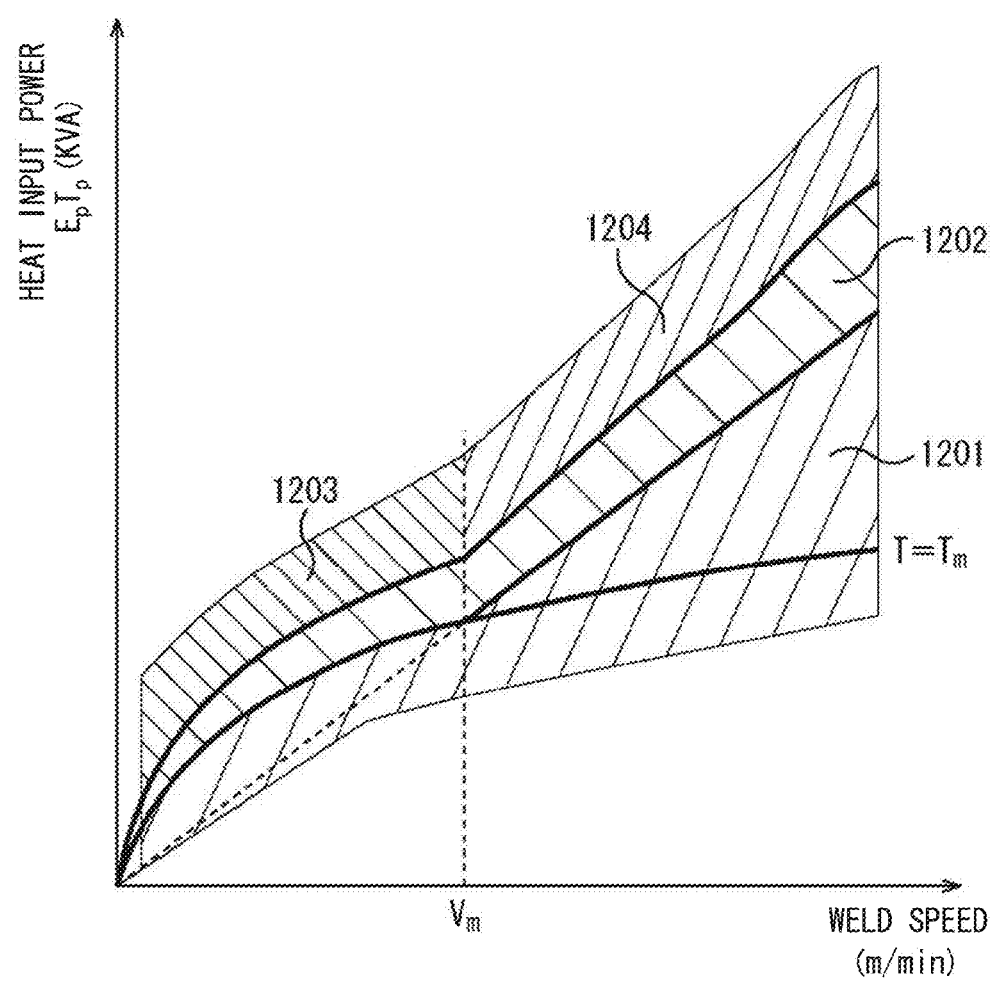
FIG. 20 is a schematic graph illustrating relationships between respective welding phenomena, and welding speed and heat input.

Next, explanation follows regarding an example of processing of the electric resistance welding operation management device 300, with reference to the flow charts of FIG. 19A and FIG. 19B.

At step S1901 in FIG. 19A, the image data input section 101 inputs Vee convergence region image data of the steel plate 1.

Next, at step S1902, the red component extraction section 102 extracts the red component (wavelengths of 590 nm to 680 nm) from the Vee convergence region image data input at step S1901.

Next, at step S1903, the binarization sections 103a, 103b binarize (invert) the red component image data obtained at step S1902.

Next, at step S1904, the labeling sections 104a, 104b respectively perform labeling processing to assign a label to each blob in the binarized images obtained by the binarization sections 103a, 103b at step S1903.

Next, at step S1905, out of the blobs assigned label numbers by the labeling section 104b at step S1904, the Vee convergence point derivation section 105 extracts a blob that matches a specific condition as the Vee convergence region blob 91, and derives the coordinates (position) of the Vee convergence point $V_1$ that is the contact point, from the extracted Vee convergence region blob 91.

Next, at step S1906, out of the blobs assigned label numbers by the labeling section 104a at step S1904, the geometric Vee convergence point derivation section 106 extracts a blob that matches the specific condition as the Vee convergence region blob 91. The geometric Vee convergence point derivation section 106 then searches for the circumferential direction edge portions 11a, 11b of the steel plate 1 in the extracted Vee convergence region blob 91, makes straight line approximations for the respective regions corresponding to the found circumferential direction edge portions 11a, 11b of the steel plate 1, and derives the intersection point of the respective straight line approximations as the coordinates (position) of the geometric Vee convergence point $V_0$.

Next, at step S1907, the welding condition determination section 114 determines whether or not the welding condition is the two-phased reduction of the Vee angle type 2 welding condition, based on the position of the Vee convergence point $V_1$ derived at the earlier step S1905, and the position of the geometric Vee convergence point $V_0$ derived at the earlier step S1906. If the Vee convergence point $V_1$ position is present further toward the steel plate 1 conveyance direction downstream side than the geometric Vee convergence point $V_0$ position, the welding condition determination section 114 determines that the welding condition is the two-phased reduction of the Vee angle type 2 welding condition. Processing proceeds to step S1908 if the welding condition determination section 114 has determined that the welding condition is the two-phased reduction of the Vee angle type 2 welding condition, and processing proceeds to step S1922 if the welding condition determination section 114 has determined that the welding condition is not the two-phased reduction of the Vee angle type 2 welding condition.

Next, at step S1908, the search region setting section 201 derives the bisector 901 of the Vee convergence angle θ that is the angle formed by the straight line approximations of the regions corresponding to the circumferential direction edge portions 11a, 11b of the steel plate 1.

Next, at step S1909, the search region setting section 201 sets the search region 902 for the slit end SE. In the present exemplary embodiment, the search region 902 for the slit end SE is a rectangular shaped region encompassing the weld line, estimated as the bisector 901 of the Vee convergence angle θ obtained at step S1908 (the estimated weld line mentioned above). The search region 902 for the slit end SE is a region set with the Vee convergence point $V_1$ as the upstream end, the downstream end of the image as the downstream end, and with a width extending a distance D from the bisector 901 of the Vee convergence angle θ in both the y axis positive direction and negative direction respectively.

Next, at step S1910, the search region binarization section 202 extracts data of the search region 902 for the slit end SE set at step S1909 from the red component image data obtained at step S1902, and binarizes (inverts) the extracted data.

Next, at step S1911, the search region labeling section 203 performs labeling processing to assign labels to each blob in the binarized image of the search region 902 for the slit end SE obtained at step S1910.

Next, at step S1912, the slit end position derivation section 204 derives the aspect ratio (vertical direction blob length/horizontal direction blob length) for each blob assigned a label number by the search region labeling section 203, and determines whether or not any blobs are present with an aspect ratio of less than ½.

When the slit end position derivation section 204 has determined that blobs with an aspect ratio of less than ½ are present, processing proceeds to step S1913. At step S1913, out of the blobs with an aspect ratio below the threshold value, the slit end position derivation section 204 derives the coordinates of the furthest downstream point of the blob that is furthest downstream in the steel plate 1 conveyance direction as the coordinates (position) of the slit end SE.

However, when the slit end position derivation section 204 has determined that there are no blobs present with an aspect ratio of less than ½, processing proceeds to step S1914. At step S1914, the slit end position derivation section 204 derives the coordinates of the Vee convergence point $V_1$ derived at step S1905 as the coordinates (position) of the slit end SE.

When the slit end position derivation section 204 has derived the coordinates of the slit end SE as described above, at step S1915, the slit end position derivation section 204 stores the derived slit end SE coordinates in the slit end position storage section 205.

Next, at step S1916, the welding point position derivation section 206 determines whether or not the slit end SE coordinates have been derived from each respective image data successively captured over 3 sec. In the present exemplary embodiment, since image capture is performed at a frame rate of 40 fps, the welding point position derivation section 206 determines whether or not 120 individual slit end SE coordinates have been derived.

Processing returns to step S1901 if the welding point position derivation section 206 has determined that the slit end SE coordinates have not yet been derived from each respective image data successively captured over 3 sec, and the processing of step S1901 to step S1915 is performed to derive the slit end SE coordinates from the next obtained image data.

If the slit end SE coordinates have been derived for each respective image data successively captured over 3 sec, processing proceeds to step S1917, illustrated in FIG. 19B.

At step S1917, out of each of the slit end SE coordinates obtained in the processing of step S1901 to step S1916 in FIG. 19A, the welding point position derivation section 206 derives the coordinates furthest downstream in the steel plate 1 conveyance direction as the coordinates of the welding point W.

Next, at step S1918, the distance G derivation section 111 derives the distance between the welding point W coordinates of the steel plate 1 derived at step S1917 and the coordinates of the squeeze center position C that is set in advance, as the distance G between the welding point and the squeeze center position.

Next, at step S1919, the heat input controller 113 reads a threshold value corresponding to the steel type subject to heat input control, as the threshold value for the distance G.

Next, at step S1920, the heat input controller 113 determines whether or not the distance G derived at step S1918 is the threshold value read at step S1919, or shorter.

Processing proceeds to step S1921 if the heat input controller 113 determines that the distance G is the threshold value, or shorter. At step S1921, the heat input controller 113 restricts an upper limit value, and controls the power amount output from the high frequency power source 6, so as to lower the heat input power. Heat input control processing is then ended.

However, processing proceeds to step S1922 if the heat input controller 113 determines that the distance G is not the threshold value, or shorter. At step S1922, the heat input controller 113 performs other heat input control processing. The other heat input control processing is, for example, processing to control the power amount output from the high frequency power source 6 so as to raise the heat input power when the welding condition is the type 1 welding condition or the type 2 welding condition, or is processing to control the power amount output from the high frequency power source 6 so as to maintain the heat input power when the welding condition is neither the type 1 welding condition nor the type 2 welding condition. Heat input control processing is then ended.

SUMMARY

Based on the finding that there is a high likelihood of the slit end SE of the weld slit S being present at either the Vee convergence point $V_1$ position or the welding point W position (the extended position of the weld slit S), the electric resistance welding operation management device 300 of the third exemplary embodiment of the present invention derives the position of the slit end SE online from the "Vee convergence region images of the steel plate 1 subject to heat input control" that are successively captured over 3 sec. From out of the derived slit end SE positions, the electric resistance welding operation management device 300 moreover derives the slit end SE position that is furthest downstream in the steel plate 1 conveyance direction as the position of the welding point W of the steel plate 1.

Moreover, based on the finding that when the distance G between the welding point W and the squeeze center position is the threshold value, or shorter, insufficient transmission of pressing force to the welding faces means that oxide developing at the welding faces is not externally discharged, lowering weld quality, the electric resistance welding operation management device 300 derives the distance G between the welding point and the squeeze center position from the position of the welding point W of the steel plate 1 subject to heat input control, and the squeeze center position C that is set in advance. Then, if the derived distance G is the threshold value, or shorter for the steel type of the steel plate 1 subject to heat input control, the electric resistance welding operation management device 300 restricts the upper limit value of the heat input power to control the power amount output from the high frequency power source 6, so as to lower the heat input power.

Accordingly, the heat input to make the welding condition the two-phased reduction of the Vee angle type 2 welding condition is controllable using the distance G as a guide. The electric resistance welding operation management device 300 according to the third exemplary embodiment of the present invention accordingly enables the heat input power to be controlled to make the welding condition the two-phased reduction of the Vee angle type 2 welding condition more easily and more reliably than hitherto.

Modified Examples

In the third exemplary embodiment, the high frequency power source 6 is controlled automatically based on the position of the welding point W on the steel plate 1 subject to heat input control. However, this need not always be the case. For example, so as to inform the operator, the welding point position derivation section 206 may display the position of the welding point W on the steel plate 1 subject to heat input control on a display screen, or the distance G derivation section 111 may display the distance G of the steel plate 1 subject to heat input control, such as on a display screen. In such cases, the operator may instruct the high frequency power source 6 to change to a target heat input based on the displayed information.

In the present exemplary embodiment, out of the slit ends SE derived from the respective "Vee convergence region images of the steel plate 1 subject to heat input control" that are successively captured over 3 sec, the slit end SE furthest downstream in the steel plate 1 conveyance direction is derived as the position of the welding point W of the steel plate 1 subject to heat input control. However, this need not always be the case. The results illustrated in FIG. 15 demonstrate that capturing Vee convergence region images of the steel plate 1 subject to heat input control over a cycle of 250 msec enables capture of at least one (upward-projecting) peak showing the slit end SE position. The position of the welding point W (the furthest downstream position of the slit end SE) of the steel plate 1 is accordingly obtainable online by performing image capture of Vee convergence region images of the steel plate 1 subject to heat input control successively over a duration of 250 msec or greater. However, as described above, the Vee convergence region images of the steel plate 1 subject to heat input control are preferably successively captured over 3 sec or longer, since this enables one cycle worth of images to be obtained including all causes of variation in electric resistance welding (such as variation in forming).

As described above, a moving average over a second specific duration may be taken for the position of the welding point W on the steel plate 1 obtained for each first specific duration, with this moving average being taken as the position of the welding point W on the steel plate 1. By employing such a moving average, the output steel plate 1 welding point W position is averaged out even when, at a given timing, a position that differs greatly from the actual welding point W of the steel plate 1 is derived as the position of the welding point W on the steel plate 1. Heat input control based on positions differing greatly from the actual position can accordingly be prevented. Moreover, employing a moving average increases the interval for outputting the position of the welding point W on the steel plate 1 subject to heat input control, thereby enabling the position of the welding point W on the steel plate 1 subject to heat input control to be output at a timing aligned with a response time of the heat input control to the steel plate 1. Moreover, in cases in which the operator is informed of the position of the position of the welding point W on the steel plate 1 subject to heat control, and/or the distance G, these may be output at intervals that allow the operator recognition and operating time. Automatically performing heat input control to the steel plate 1 enables more heat input control to the steel plate 1 than is necessary to be suppressed. The second specific duration may be determined in consideration of factors such as a heat input fluctuation time constant and speed at which the operator operates, for example a moving average time of 10 sec.

Moreover, in the present exemplary embodiment, the search region 902 for the slit end SE is set based on the bisector 901 of the Vee convergence angle θ. However, this need not always be the case. For example, the search region 902 for the slit end SE may be set employing a center line of the Vee convergence region blob 91 passing through the geometric Vee convergence point $V_0$, instead of the bisector 901 of the Vee convergence angle θ.

Moreover, in the present exemplary embodiment, heat input is controlled based on the result of comparing the distance G between the welding point W and the squeeze center position C against the threshold value. However, this need not always be the case. For example, a distance between the position of the welding point W on the steel plate 1 subject to heat input control and a fixed position to the downstream side of the welding point W other than the squeeze center position C, for example the downstream end of the captured image, may be employed in place of the distance G.

Moreover, instead of such a distance, heat input may be controlled based on an absolute position of the position of the welding point W on the steel plate 1 subject to heat input control. For example, the high frequency power source 6 may be controlled to lower the heat input such that the position of the welding point W on the steel plate 1 subject to heat input control does not reach further downstream than a specific fixed position.

Note that out of the exemplary embodiments described above, the processing performed in the electric resistance welding operation management device 100, 200, 300 may be implemented by a computer executing a program. Moreover, a computer-readable storage medium stored with such a program, or a computer program product of such a computer program, may also be applied as an exemplary embodiment of the present invention. A flexible disk, a hard disk, an optic disk, an magneto-optical disk, a CD-ROM, magnetic tape, a non-volatile memory card, ROM or the like may be employed as such a storage medium.

Each of the exemplary embodiments of the present invention described above are merely specific examples of embodiments of the present invention, and interpretation of the technical scope of the invention is not limited thereby. Namely, various modifications may be implemented without departing from the technical concept or spirit of the present invention.

Relationship to the Claims

The image input means (step) may, for example, be implemented by the image data input section 101 acquiring image data that includes the Vee convergence region of the steel plate 1 subject to heat input control.

The first position detection means (step) may, for example, be implemented by the geometric Vee convergence point derivation section 106 making straight line approximations for the regions corresponding to the circumferential direction edge portions 11a, 11b of the steel plate 1, and detecting the intersection point of the respective straight line approximations as the geometric Vee convergence point $V_0$.

The second position detection means (step) may, for example, be implemented by the red component extraction section 102, the binarization section 103b, the labeling section 104b and the Vee convergence point derivation section 105 executing the processing of step S1102 to step S1105 illustrated in FIG. 11 on the image data including the Vee convergence region of the steel plate 1 subject to heat input control.

The welding point position derivation means (step) may, for example, be implemented by, the welding point position derivation section 206 deriving as the position of the welding point W, from out of the slit end SE positions derived from each of the plural Vee convergence region images successively captured over a specific duration, the slit end SE position furthest downstream in the steel plate 1 conveyance direction. The welding point position derivation means (step) may also, for example, be implemented by the welding point position derivation section 110 deriving, as the welding point position, a point at a position to the steel plate 1 conveyance direction downstream side from the position of the Vee convergence point $V_1$ derived by the Vee convergence point derivation section 105 by the distance ΔL stored in the distance ΔL storage section 109.

The storage means (step) may, for example, be implemented by the image data input section 101, the red component extraction section 102, the binarization section 103b, the labeling section 104b, the Vee convergence point derivation section 105, and the distance ΔL derivation section 108 performing the processing illustrated in the flow chart in FIG. 11 to derive the distance ΔL, and the distance ΔL derivation section 108 storing the derived distance ΔL in the distance ΔL storage section 109.

The determination means (step) may, for example, be implemented by the welding condition determination section 114 outputting a determination signal if the Vee convergence point $V_1$ position is determined to be present further to the steel plate 1 conveyance direction downstream side than the geometric Vee convergence point $V_0$ position.

The heat input control means (step) may, for example, be implemented by the heat input controller 113 executing the processing of step S1207 to step S1209 of FIG. 12.

The distance ΔL derivation means (step) may, for example, be implemented by the Vee convergence point derivation section 105 deriving, as the distance ΔL, the distance between the average position of the Vee convergence point $V_1$ derived by the Vee convergence point derivation section 105, and the position of the welding point identified visually by an operator or the position of the welding point W derived by the first welding point position derivation section 120.

The display means may be implemented by, for example, the welding point position derivation section 110 or 206 displaying the position of the welding point W on the steel plate 1 subject to heat input control on the display screen, and/or by the distance G derivation section 111 displaying the distance G of the steel plate 1 subject to heat input control on the display screen.

The slit end position derivation means may, for example, be implemented by, from out of blobs with an aspect ratio below the threshold value, deriving as the coordinates (position) of the slit end SE the coordinates of the furthest downstream point of the blob present furthest downstream in the steel plate 1 conveyance direction.

The search region setting means may, for example, be implemented by the search region setting section 201 setting a rectangular region encompassing the estimated weld line as the search region 902 for the slit end SE.

The disclosures of Japanese Patent Application No. 2012-095073 and Japanese Patent Application No. 2012-150610 are incorporated in their entirety in the present specification.

All publications, patent applications and technical standards mentioned in the present specification are incorporated by reference in the present specification to the same extent as if each individual publication, patent application, or technical standard was specifically and individually indicated to be incorporated by reference.

EXPLANATION OF THE REFERENCE NUMERALS 1 steel plate
2 squeeze roll
3 contact tip
4 impeder
5 image capture device
6 high frequency power source
100, 200, 300 electric resistance welding operation management device

The invention claimed is:

1. An electric resistance welding operation management device that manages an electric resistance welding operation during manufacture of electric resistance welded steel pipe, in which heat is input to a metal plate, that is being conveyed along a specific conveyance direction and formed into a circular tube shape while pressing side faces of the metal plate with a pair of squeeze rolls, to weld together two circumferential direction edge portions of the metal plate converging in a V-shape, the electric resistance welding operation management device comprising a processor that causes the electric resistance welding operation management device to function as:

an image input section that is configured to input a plurality of images that are successively captured over a specific duration and each include a Vee convergence region that is a region where the metal plate converges in a V-shape;

a first position detection section that is configured, based on the images input by the image input section, to detect the position of a geometric Vee convergence point that is a geometric intersection point of the two circumferential direction edge portions of the metal plate converging in a V-shape;

a second position detection section that is configured, based on the images input by the image input section, to detect the position of a Vee convergence point that is an contact point where the two circumferential direction edge portions of the metal plate converging in a V-shape abut each other;

a welding point position derivation section that is configured, based on each of the plurality of images input by the image input section, to derive the position of a welding point, based on acquired data that takes as the position of a welding point the position, out of positions at each point in time within the specific duration, of a slit end at the furthest conveyance direction downstream point of a weld slit, having the Vee convergence point as a base point and extending further than the Vee convergence point toward the metal plate conveyance direction downstream side, at the point in time when the slit end is positioned furthest downstream in the conveyance direction;

a determination section that is configured to determine whether or not the position of the geometric Vee convergence point detected by the first position detection section and the position of the Vee convergence point detected by the second position detection section are present at different positions to each other; and a heat input control section that is configured, when the position of the geometric Vee convergence point and the position of the Vee convergence point are determined by the determination section to be present at different positions to each other, to lower a heat input power to the metal plate in cases in which a distance between the position of the welding point derived by the welding point position derivation section and a position corresponding to an installation position of the pair of squeeze rolls has become a threshold value, or shorter.

2. The electric resistance welding operation management device of claim 1, wherein the processor further causes the electric resistance welding operation management to function as:

a storage section that is configured, prior to the derivation of the position of a welding point being performed by the welding point position derivation section, to store in advance a distance $\Delta L$ between the position of a welding point expressed by the data obtained in advance prior to the derivation of the position of a welding point being performed by the welding point position derivation section and the position of the Vee convergence point detected by the second position detection section in advance prior to the derivation of the position of a welding point being performed by the welding point position derivation section;

wherein, the welding point position derivation section is configured to derive the position of the metal plate welding point based on the position of the Vee convergence point detected by the second position detection section when performing the derivation of the position of a welding point and the distance $\Delta L$ stored in the storage section prior to the derivation of the position of a welding point being performed by the welding point position derivation section.

3. The electric resistance welding operation management device of claim 2, wherein the storage section is configured to store the distance $\Delta L$ for each steel type prior to the derivation of the position of a welding point being performed by the welding point position derivation section.

4. The electric resistance welding operation management device of claim 2, wherein the processor further causes the electric resistance welding operation management to function as:

a distance $\Delta L$ derivation section that is configured to derive the distance $\Delta L$ based on the position of the Vee convergence point derived by the second position detection section, and the position of the welding point expressed by the data; and the storage section is configured to store the distance $\Delta L$ derived by the distance $\Delta L$ derivation section before the position of the welding point is derived by the welding point position derivation section.

5. The electric resistance welding operation management device of claim 4, wherein:

the distance $\Delta L$ derivation section is configured, based on each of a plurality of images captured over a duration that is at least longer than a fluctuation cycle of the Vee convergence point position, to derive as the distance $\Delta L$ a distance between an average position of the Vee convergence point derived by the second position detection section and the welding point position expressed by the data.

6. The electric resistance welding operation management device of claim 1, wherein the welding point position derivation section is configured to comprise a slit end position derivation section that is configured, based on each of the plurality of images input by the image input section, to derive the position of a slit end of a weld slit for each image input by the image input section, and, out of the slit end positions derived by the slit end position derivation section, to derive the slit end position positioned furthest downstream in the conveyance direction as the position of the welding point.

7. The electric resistance welding operation management device of claim 6, wherein the processor further causes the electric resistance welding operation management to function as:

a search region setting section that is configured to set a search region for the slit end, based on the position of the geometric Vee convergence point detected by the first position detection section, and an estimated weld line that is a weld line estimated as a bisector of a Vee convergence angle that is an angle formed between straight line approximations of regions corresponding to the circumferential direction edge portions of the Vee convergence region of the metal plate; and the slit end position derivation section is configured to derive the position of the slit end within the search region set by the search region setting section.

8. The electric resistance welding operation management device of claim 6, wherein each of the images input by the image input section is an image captured with an exposure time of $\frac{1}{5000}$ sec or under.

9. The electric resistance welding operation management device of claim 6, wherein:

out of a plurality of slit end positions derived by the slit end position derivation section, the welding point position derivation section is configured to derive a moving average value of coordinate values expressing the position of a slit end positioned furthest downstream in the conveyance direction as the position of a welding point.

10. The electric resistance welding operation management device of claim 1, wherein the image input section is configured to input a plurality of images successively captured over a duration of 250 msec or greater.

11. The electric resistance welding operation management device of claim 1, wherein:

the heat input control section is configured to control so as to lower the heat input power to the metal plate when a distance between the position of the welding point derived by the welding point position derivation section and a flat plane including the axial centers of the pair of squeeze rolls is a specific threshold value or shorter.

12. The electric resistance welding operation management device of claim 1, wherein the processor further causes the electric resistance welding operation management to function as:

a display section that is configured to display at least one out of the position of the welding point derived by the welding point position derivation section, or a distance between the position of a welding point derived by the welding point position derivation section and a position corresponding to an installation position of the pair of squeeze rolls.

13. A non-transitory computer program medium that stores a program that causes a computer functioning as the respective sections of the welding operation management device of claim 1.

14. An electric resistance welding operation management method that manages an electric resistance welding operation during manufacture of electric resistance welded steel pipe, in which heat is input to a metal plate, that is being conveyed along a specific conveyance direction and formed into a circular tube shape while pressing side faces of the metal plate with a pair of squeeze rolls, to weld together two circumferential direction edge portions of the metal plate converging in a V-shape, the electric resistance welding operation management method comprising:

inputting a plurality of images that are successively captured over a specific duration and each include a Vee convergence region that is a region where the metal plate converges in a V-shape;

detecting, based on the inputted images, the position of a geometric Vee convergence point that is a geometric intersection point of the two circumferential direction edge portions of the metal plate converging in a V-shape;

detecting, based on the inputted images, the position of a Vee convergence point that is an contact point where the two circumferential direction edge portions of the metal plate converging in a V-shape abut each other;

deriving, based on each of the plurality of inputted imaged, the position of a welding point, based on acquired data that takes as the position of a welding point the position, out of positions at each point in time within the specific duration, of a slit end at the furthest conveyance direction downstream point of a weld slit, having the Vee convergence point as a base point and extending further than the Vee convergence point toward the metal plate conveyance direction downstream side, at the point in time when the slit end is positioned furthest downstream in the conveyance direction;

determining whether or not the position of the detected geometric Vee convergence point and the detected position of the Vee convergence point are present at different positions to each other; and when the position of the geometric Vee convergence point and the position of the Vee convergence point are determined to be present at different positions to each other, lowering a heat input power to the metal plate in cases in which a distance between the derived position of the welding point and a position corresponding to an installation position of the pair of squeeze rolls has become a threshold value, or shorter.

15. The electric resistance welding operation management method of claim 14, further comprising:

prior to the derivation of the position of a welding point being performed, storing in advance a distance ΔL between the position of a welding point expressed by the data obtained in advance prior to the derivation of the position of a welding point being performed and the position of the Vee convergence point detected in advance prior to the derivation of the position of a welding point being performed; and deriving the position of the metal plate welding point based on the position of the detected Vee convergence point and the distance ΔL stored in advance prior to the derivation of the position of a welding point being performed.

16. The electric resistance welding operation management method of claim 15, wherein the distance ΔL is stored for each steel type in advance prior to the derivation of the position of a welding point being performed.

17. The electric resistance welding operation management method of claim 15, further comprising:

deriving the distance ΔL based on the position of the Vee convergence point and the position of the welding point expressed by the data; and storing the derived distance ΔL before the position of the welding point is derived.

18. The electric resistance welding operation management method of claim 17, wherein:

based on each of a plurality of images captured over a duration that is at least longer than a fluctuation cycle of the Vee convergence point position, deriving as the distance ΔL a distance between an average position of the derived Vee convergence point and the welding point position expressed by the data.

19. The electric resistance welding operation management method of claim 14, wherein based on each of the inputted plurality of images, deriving the position of a slit end of a weld slit for each inputted image, and out of the derived slit end positions, the slit end position positioned furthest downstream in the conveyance direction is derived as the position of the welding point.

20. The electric resistance welding operation management method of claim 19, further comprising:

setting a search region for the slit end, based on the position of the derived geometric Vee convergence point, and an estimated weld line that is a weld line estimated as a bisector of a Vee convergence angle that is an angle formed between straight line approximations of regions corresponding to the circumferential direction edge portions of the Vee convergence region of the metal plate; and deriving the position of the slit end within the set search region.

21. The electric resistance welding operation management method of claim 19, wherein each of the inputted images is an image captured with an exposure time of ⅕₀₀₀ sec or under.

22. The electric resistance welding operation management method of claim 19, wherein a plurality of images successively captured over a duration of 250 msec or greater are input.

23. The electric resistance welding operation management method of claim 19, wherein:

out of a plurality of slit end positions derived, a moving average value of coordinate values expressing the position of a slit end positioned furthest downstream in the conveyance direction is derived as the position of a welding point.

24. The electric resistance welding operation management method of claim 14, wherein:

heat input is controlled so as to lower the heat input power to the metal plate when a distance between the derived position of the welding point and a flat plane including the axial centers of the pair of squeeze rolls is a specific threshold value or shorter.

25. The electric resistance welding operation management method of claim 14, further comprising:

displaying at least one out of the derived position of the welding point, or a distance between the derived position of a welding point and a position corresponding to an installation position of the pair of squeeze rolls.

* * * * *